United States Patent
Aoai

(10) Patent No.: US 7,709,550 B2
(45) Date of Patent: May 4, 2010

(54) INK COMPOSITION, INKJET RECORDING METHOD, PRINTED MATERIAL, PROCESS FOR PRODUCING LITHOGRAPHIC PRINTING PLATE, AND LITHOGRAPHIC PRINTING PLATE

(75) Inventor: Toshiaki Aoai, Shizuoka (JP)

(73) Assignee: FUJIFILM Corporation, Tokyo (JP)

( * ) Notice: Subject to any disclaimer, the term of this patent is extended or adjusted under 35 U.S.C. 154(b) by 831 days.

(21) Appl. No.: 11/516,650

(22) Filed: Sep. 7, 2006

(65) Prior Publication Data

US 2007/0052790 A1 Mar. 8, 2007

(30) Foreign Application Priority Data

Sep. 7, 2005 (JP) .............................. 2005-259248

(51) Int. Cl.
*C08F 2/50* (2006.01)
*C08J 3/28* (2006.01)

(52) U.S. Cl. ............................. 522/81; 522/49; 522/66; 522/67; 522/74; 522/71; 522/75; 522/84; 522/168; 522/170; 522/178; 522/181; 427/508; 427/510; 427/511; 427/517; 427/514; 428/32.1; 428/32.6; 428/32.29; 106/31.13; 106/31.6

(58) Field of Classification Search .................. 522/67, 522/49, 66, 74, 71, 75, 81, 84, 168, 170, 522/178 M, 181; 427/514; 428/32.1, 32.6, 428/32.29; 106/31.13, 31.6
See application file for complete search history.

(56) References Cited

U.S. PATENT DOCUMENTS 5,665,792 A * 9/1997 Lawton et al. ................ 522/31

7,494,551 B2 * 2/2009 Yazawa et al. .............. 148/326
2005/0148687 A1 7/2005 Sasa
2007/0002115 A1 * 1/2007 Nakazawa ................... 347/102
2007/0046764 A1 * 3/2007 Nakazawa ................... 347/224

FOREIGN PATENT DOCUMENTS

| EP | 1 700 890 A2 | 9/2006 |
|---|---|---|
| JP | 63-235382 A | 9/1988 |
| JP | 03-216379 A | 9/1991 |
| JP | 3-258867 A | 11/1991 |
| JP | 3-258868 A | 11/1991 |
| JP | 5-214280 A | 8/1993 |
| JP | 6-21256 B2 | 3/1994 |
| JP | 6-62905 B2 | 8/1994 |
| JP | 09-183928 A | 7/1997 |
| JP | 2003-192943 A | 7/2003 |
| JP | 2003-192944 A | 7/2003 |
| JP | 2003-312121 A | 11/2003 |
| JP | 2003-341217 A | 12/2003 |
| JP | 2004-091558 A | 3/2004 |

OTHER PUBLICATIONS

European Search Report dated Oct. 30, 2006.

* cited by examiner

*Primary Examiner*—Sanza L McClendon
(74) *Attorney, Agent, or Firm*—Sughrue Mion, PLLC

(57) ABSTRACT

An ink composition is provided that includes a cationically polymerizable compound (a), a compound (b) that generates an acid when exposed to radiation, a colorant (c), and a salt of a weak acid having a pKa of 4 to 8 (d). There is also provided an inkjet recording method that includes a step of discharging the ink composition onto a recording medium, and a step of irradiating the discharged ink composition with radiation so as to cure the ink composition.

12 Claims, No Drawings

INK COMPOSITION, INKJET RECORDING METHOD, PRINTED MATERIAL, PROCESS FOR PRODUCING LITHOGRAPHIC PRINTING PLATE, AND LITHOGRAPHIC PRINTING PLATE

BACKGROUND OF THE INVENTION

1. Field of the Invention

The present invention relates to an ink composition suitably used for inkjet recording, an inkjet recording method, a printed material employing same, a lithographic printing plate obtained using the ink composition, and a process for producing a lithographic printing plate. More particularly, it relates to an ink composition suitable for inkjet recording that cures with high sensitivity upon exposure to radiation, can form a high quality image, has good storage stability, and does not degrade image quality or a substrate due to acid remaining in an image area after forming an image, an inkjet recording method, a printed material employing same, a lithographic printing plate obtained using the ink composition, and a process for producing a lithographic printing plate.

2. Description of the Related Art

With regard to an image recording method for forming an image on a recording medium such as paper based on an image data signal, there are an electrophotographic system, sublimation type and melt type thermal transfer systems, an inkjet system, etc. In the electrophotographic system, a process of forming an electrostatic latent image on a photosensitive drum by electrically charging and exposing is required, and the system is complicated; as a result, there is the problem that the production cost is high. With regard to the thermal transfer system, although the equipment is inexpensive, due to the use of an ink ribbon there is the problem that the running cost is high and waste material is generated. On the other hand, with regard to the inkjet system, the equipment is inexpensive and, since an image is formed directly on a recording medium by discharging an ink only on a required image area, the ink can be used efficiently and the running cost is low. Furthermore, there is little noise and it is excellent as an image recording system.

An ink composition that can be cured by exposure to radiation such as ultraviolet rays and, in particular, an inkjet recording ink (radiation curing type inkjet recording ink) are required to have sufficiently high sensitivity and provide a high image quality. By achieving higher sensitivity, a large number of benefits are provided, such as high curability toward radiation, a reduction in power consumption, longer lifetime due to a decrease in the load on a radiation generator, and prevention of formation of low molecular weight material originating from insufficient curing. Furthermore, higher sensitivity particularly improves the cure strength of an image formed using the ink composition and, in particular, the inkjet recording ink, particularly for the formation of a lithographic printing plate, and high plate life can be obtained.

Such an inkjet system of a type that is cured by radiation such as, for example, ultraviolet rays, generates a relatively low degree of odor and can be applied to recording on a recording medium that does not have quick drying properties or ink absorbing properties; the system has therefore attracted attention in recent years, and an inkjet ultraviolet-curable ink composition employing radical polymerization has been disclosed (ref., for example, JP-A-63-235382, JP-A-3-216379, JP-A-5-214280, JP-B-6-21256, and JP-B-6-62905; JP-A denotes a Japanese unexamined patent application publication, and JP-B denotes a Japanese examined patent application publication). Furthermore, for the purpose of providing an inkjet recording ink that enables an image having high adhesion to a recording medium to be recorded with high sensitivity without spreading, even for a support for which it is usually difficult to carry out direct recording by the inkjet recording method, and where the inkjet recording ink has little skin irritation or sensitization and has high safety, there has been proposed a composition containing a color material and a polymerizable compound comprising a group of specified radically polymerizable acrylate compounds (ref., for example, JP-A-2003-192943 and JP-A-2003-192944). These radically polymerizable inks have excellent curing speed and can form an image without spreading, but they have the problem that the adhesion to the recording medium is degraded due to volume shrinkage during curing.

Because of this, in order to improve the adhesion to the recording medium, cationically polymerizable ink compositions having a low shrinkage ratio during ultraviolet curing have been proposed (ref., for example, JP-A-9-183928). However, these cationically polymerizable inks do not have sufficient storage stability due to a reaction involving an acid generated over time, and this is a big barrier to their actual application. Because of this, as an attempt to improve the storage stability, there has been proposed a technique in which a basic compound or an agent that generates a base on heating is added (ref., for example, JP-A-2003-312121, JP-A-2003-341217, and JP-A-2004-91558), but it has been found that there is the new problem that, since the basic compound inhibits the function of an acid generated on exposure to light, the curing sensitivity of the ink is degraded. Because of this, there has been a desire for the achievement of storage stability and high sensitivity at the same time.

BRIEF SUMMARY OF THE INVENTION

It is an object of the present invention, which has been accomplished under the above-mentioned circumstances, to provide an ink composition that cures with high sensitivity upon exposure to radiation, can form a high quality image, has excellent adhesion to a recording medium, and has good storage stability, and an inkjet recording method employing the ink composition.

Furthermore, it is another object of the present invention to provide a printed material and a lithographic printing plate obtained using an ink composition that has excellent storage stability and can be cured with high sensitivity upon exposure to ultraviolet rays, and a process for producing a lithographic printing plate.

The above-mentioned objects can be accomplished by (1), (6), and (8) to (10) below. (2) to (5) and (7), which are preferred embodiments, are also shown below.

(1) An ink composition comprising (a) a cationically polymerizable compound, (b) a compound that generates an acid when exposed to radiation, (c) a colorant, and (d) a salt of a weak acid having a pKa of 4 to 8, (2) the ink composition according to (1), wherein the salt of the weak acid having a pKa of 4 to 8 is an ammonium salt, (3) the ink composition according to either (1) or (2), wherein the colorant is a pigment or an oil-soluble dye, (4) the ink composition according to (3), wherein the oil-soluble dye has an oxidation potential of 1.0 V (vs SCE) or greater, (5) the ink composition according to any one of (1) to (4), wherein it is for inkjet recording, (6) an inkjet recording method comprising a step (a) of discharging an ink composition onto a recording medium and a step (b) of irradiating the discharged ink composition with actinic radiation so as to cure the ink composition, the ink composition being the ink composition according to any one of (1) to (5), (7) the inkjet recording method according to (6), wherein the actinic radiation is ultraviolet radiation emitted by a light emitting diode that has a light emission peak wavelength in the range of 350 to 420 nm and generates ultraviolet radiation whose maximum illumination intensity on the surface of a recording medium is 10 to 2,000 mW/cm$^2$, (8) a printed material recorded by the inkjet recording method according to either (6) or (7), (9) a process for producing a lithographic printing plate, the process comprising a step (a) of discharging the ink composition according to any one of (1) to (5) onto a hydrophilic support and a step (b) of irradiating the discharged ink composition with actinic radiation so as to cure the ink composition, thus forming a hydrophobic image on the hydrophilic support by curing the ink composition, and

(10) a lithographic printing plate produced by the lithographic printing plate production process according to (9).

DETAILED DESCRIPTION OF THE INVENTION

The ink composition of the present invention (hereinafter, also called simply 'ink') can be cured by exposure to radiation, and comprises (a) a cationically polymerizable compound, (b) a compound that generates an acid when exposed to radiation, (c) a colorant, and (d) a salt of a weak acid having a pKa of 4 to 8.

The 'radiation' referred to in the present invention is not particularly limited as long as it is actinic radiation that can provide energy allowing an initiator species to be generated in an ink composition by the radiation, and broadly includes α rays, γ rays, X rays, ultraviolet rays, visible rays, and electron beams and, among these, ultraviolet rays and electron beams are preferable from the viewpoint of curing sensitivity and the availability of equipment, and ultraviolet rays are particularly preferable. With regard to the ink composition of the present invention, an ink composition that can be cured when exposed to ultraviolet rays as radiation is therefore preferable.

The present invention is explained in detail below.

(d) Salt of Weak Acid Having pKa of 4 to 8

The ink composition of the present invention comprises a salt of a weak acid having a pKa of 4 to 8.

In the present invention, the pKa denotes a pKa measured at around room temperature (10° C. to 35° C., preferably 16° C. to 25° C., and more preferably 25° C.) using water as a medium. Furthermore, if the pKa is 4 to 8 at any temperature between 10° C. and 35° C., the requirement of the present invention is substantially satisfied.

The salt of the weak acid having a pKa of 4 to 8 used in the present invention is preferably a salt of a weak acid having a pKa of 4 to 7, and more preferably a salt of a weak acid having a pKa of 4.2 to 6.5.

When it is a salt of a weak acid having a pKa of less than 4, it exhibits reactivity toward a cationically polymerizable compound (compound (a) of the present invention), and polymerizes as time passes, thus degrading the storage stability. When the salt of the weak acid has a pKa exceeding 8, since it scavenges acid generated from compound (b) of the present invention upon exposure to radiation, the sensitivity is degraded.

It is surmised that in the present invention, since acid and/or base generated in the ink composition can be buffered by adding the salt of the weak acid having a pKa of 4 to 8, the aging stability of the ink composition is improved.

Examples of the weak acid having a pKa of 4 to 8 used in the present invention include carboxylic acids such as, for example, monocarboxylic acids, dicarboxylic acids, tricarboxylic acids, hydroxycarboxylic acids, and aminocarboxylic acids. Furthermore, a salt of a weak inorganic acid can also be used, and examples thereof include carbonates.

As specific examples, the compounds below can be cited. Figures inside parentheses after the compounds are shown to distinguish first pKa and second pKa.

TABLE 1

| Compound | ° C. | pKa | Compound | ° C. | pKa |
|---|---|---|---|---|---|
| Acetic | 25 | 4.75 | p-Hydroxybenzoic(1) | 19 | 4.48 |
| Acetoacetic | 25 | 3.58 | β-Hydroxybutyric | 25 | 4.70 |
| Acrylic | 25 | 4.25 | γ-Hydroxybutyric | 25 | 4.72 |
| Adipamic | 25 | 4.63 | β-Hydroxypropionic | 25 | 4.51 |
| Adipic(1) | 25 | 4.43 | Itaconic(2) | 25 | 5.45 |
| Adipic(2) | 25 | 4.41 | Maleic(2) | 25 | 6.07 |
| Alloxanic | 25 | 6.64 | Malic(2) | 25 | 5.11 |
| o-Aminobenzoic | 25 | 6.97 | Malonic | 25 | 5.69 |
| m-Aminobenzoic | 25 | 4.78 | Mesaconic(2) | 25 | 4.75 |
| p-Aminobenzoic | 25 | 4.92 | Mesitylenic | 25 | 4.32 |
| Anisic | 25 | 4.47 | Methyl-o-aminobenzoic | 25 | 5.34 |
| o-β-Anisylpropionic | 25 | 4.80 | Methyl-m-aminobenzoic | 25 | 5.10 |
| m-β-Anisylpropionic | 25 | 4.65 | Methyl-p-aminobenzoic | 25 | 5.04 |
| p-β-Anisylpropionic | 25 | 4.69 | o-Methylcinnamic | 25 | 4.50 |
| Ascorbic(1) | 24 | 4.10 | m-Methylcinnamic | 25 | 4.44 |
| Barbituric | 25 | 4.01 | p-Methylcinnamic | 25 | 4.56 |
| Benzoic | 25 | 4.19 | β-Methylglutaric | 25 | 4.24 |
| n-Butyric | 20 | 4.81 | Methylsuccinic(1) | 25 | 4.13 |
| iso-Butyric | 18 | 4.84 | Methylsuccinic(2) | 25 | 5.64 |
| β-Chlorobutyric | R.T. | 4.05 | β-Naphthoic | 25 | 4.17 |
| γ-Chlorobutyric | R.T. | 4.52 | o-Nitrophenol | 25 | 7.17 |
| o-Chlorocinnamic | 25 | 4.23 | p-Nitrophenol | 25 | 7.15 |
| m-Chlorocinnamic | 25 | 4.29 | o-β-Nitrophenylpropionic | 25 | 4.50 |
| p-Chlorocinnamic | 25 | 4.41 | p-β-Nitrophenylpropionic | 25 | 4.47 |
| o-Chlorophenylacetic | 25 | 4.07 | Nonanic | 25 | 4.96 |
| m-Chlorophenylacetic | 25 | 4.14 | Octanic | 25 | 4.89 |

TABLE 1-continued

| Compound | °C. | pKa | Compound | °C. | pKa |
|---|---|---|---|---|---|
| p-Chlorophenylacetic | 25 | 4.19 | Oxalic(2) | 25 | 4.19 |
| β-(o-Chlorophenyl)propionic | 25 | 4.58 | Phenylacetic | 18 | 4.28 |
| β-(m-Chlorophenyl)propionic | 25 | 4.59 | γ-Phenylbutyric | 25 | 4.76 |
| β-(p-Chlorophenyl)propionic | 25 | 4.61 | α-Phenylpropionic | 25 | 4.64 |
| trans-Cinnamic | 25 | 4.44 | β-Phenylpropionic | 25 | 4.37 |
| Citric(2) | 18 | 4.77 | o-Phthalic(2) | 25 | 5.51 |
| Citric(3) | 18 | 6.39 | m-Phthalic(2) | 18 | 4.60 |
| Crotonic(trans-) | 25 | 4.69 | p-Phthalic(2) | 16 | 4.82 |
| Cyclohexane-1,1-dicarboxylic(2) | 25 | 6.11 | Pimelic | 25 | 4.71 |
| Cyclopropane-1,1-dicarboxylic(2) | 25 | 7.43 | Propionic | 25 | 4.87 |
| L-Cystine(1) | 25 | 7.85 | iso-Propylbenzoic | 25 | 4.40 |
| Dichlorophenol(2,3-) | 25 | 7.44 | 2-Pyridinecarboxylic | 25 | 5.52 |
| Dihydroxybenzoic(3,4-) | 25 | 4.48 | 3-Pyridinecarboxylic | 25 | 4.85 |
| Dihydroxybenzoic(3,5-) | 25 | 4.04 | 4-Pyridinecarboxylic | 25 | 4.96 |
| Dimethylmalic(2) | 25 | 6.06 | Suberic | 25 | 4.52 |
| Dinitrophenol(3,6-) | 15 | 5.15 | Succinic(1) | 25 | 4.16 |
| Ethylbenzoic | 25 | 4.35 | Succinic(2) | 25 | 5.61 |
| Ethylphenylacetic | 25 | 4.37 | α-Tartaric(2) | 25 | 4.34 |
| Fumaric(trans-)(2) | 18 | 4.44 | meso-Tartaric(2) | 25 | 4.82 |
| Gallic | 25 | 4.41 | m-Toluic | 25 | 4.27 |
| Glutaramic | 25 | 4.60 | p-Toluic | 25 | 4.36 |
| Glutaric(1) | 25 | 4.34 | Trichlorophenol | 25 | 6.00 |
| Glutaric(2) | 25 | 5.41 | Trimethylacetic | 25 | 5.03 |
| Heptanoic | 25 | 4.89 | n-Valeric | 18 | 4.82 |
| Hexahydrobenzoic | 25 | 4.90 | iso-Valeric | 25 | 4.77 |
| Hexanoic | 25 | 4.88 | Vinylacetic | 25 | 4.34 |
| m-Hydroxybenzoic(1) | 19 | 4.06 | | | |

Among these compounds, preferred examples of the weak acid include compounds having low volatility and little odor, and more preferred examples of the weak acid include aromatic carboxylic acids.

The salt of the weak acid referred to here means a compound in which at least one dissociating hydrogen ion contained in the weak acid is replaced with a cation such as a metal ion or an ammonium ion, and can be formed by neutralization of the weak acid with a base.

The salt is not particularly limited as long as it can be used as a cation; any known salt may be used, and either an inorganic salt or an organic salt may be used.

Examples of the metal suitable as the inorganic salt include alkali metals, alkaline earth metals, metals of main group III, and metals of sub group II. Metal complexes may also be used.

Preferred examples of the metal include lithium, sodium, potassium, cesium, magnesium, calcium, strontium, and barium. Examples of the metal complex include complexes of copper, zinc, iron, cobalt, nickel, molybdenum, and tungsten.

Examples of the organic salt include ammonium salts that are fully or partially substituted with an organic group.

In the present invention, an organic salt is preferable since it can be expected to have a high buffering action in an organic solvent, and an ammonium salt can be cited as an example.

The ammonium salt is represented by $N^+R^1R^2R^3R^4$. $R^1$ to $R^4$ independently denote a hydrogen atom or a monovalent organic group. $R^1$ to $R^4$ may be bonded to form a ring. The ammonium salt is preferable since it can be expected to have a high buffering action in an organic solvent. Specific examples thereof include ammonium, tetramethylammonium, tetraethylammonium, tetrapropylammonium, tetrabutylammonium, tetrapentylammonium, tetrahexylammonium, tetraheptylammonium, trimethylbutylammonium, trimethyloctylammonium, trimethyldodecylammonium, trimethylphenylammonium, trimethylbenzylammonium, trimethylchloroethylammonium, trimethylbromoethylammonium, trimethylhydroxyethylammonium, trimethylglycidylammonium, triethylhexylammonium, triethylbenzylammonium, tributylbenzylammonium, dimethyidodecylbenzylammonium, methyltrihexylammonium, methyltrioctylammonium, didodecyldimethylammonium, diallyidimethylammonium, N,N-dimethylpyrrolidinium, and N,N-dimethylpiperidinium, and among these compounds, ammonium, tetramethylammonium, tetraethylammonium, tetrabutylammonium, trimethyldodecylammonium, trimethylphenylammonium, trimethylbenzylammonium, and trimethylhydroxyethylammonium are preferable.

As the salt of the weak acid having a pKa of 4 to 8 used in the present invention, the compounds below can be cited as preferred examples (Specific example (1) to Specific example (44)).

(1)

(2)

(3)

(4)

(5)

(6)

(7)

(8)

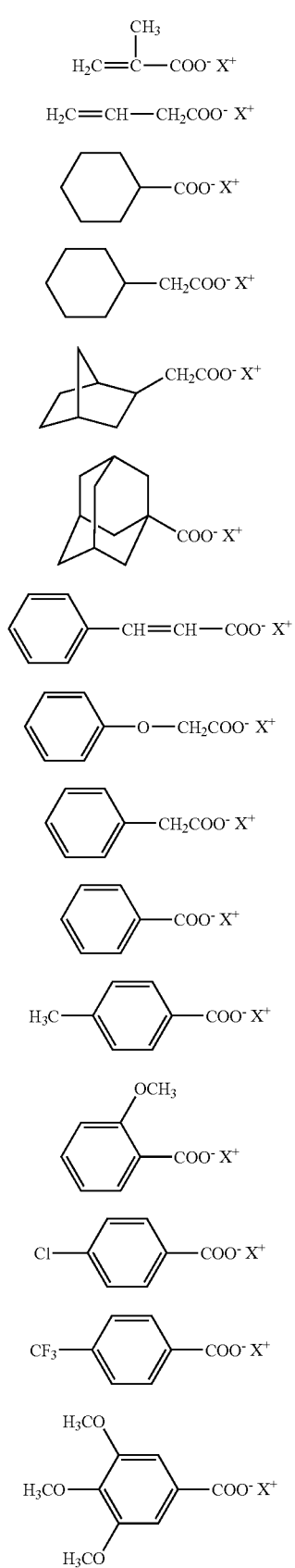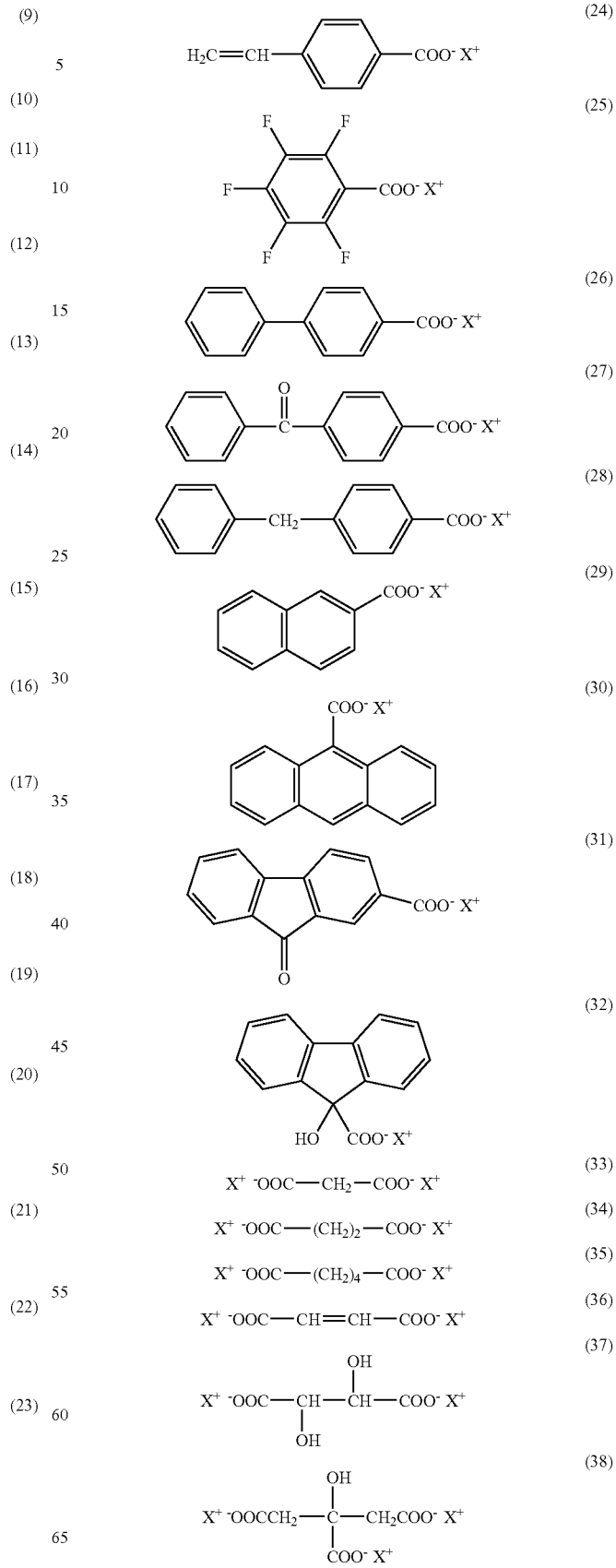

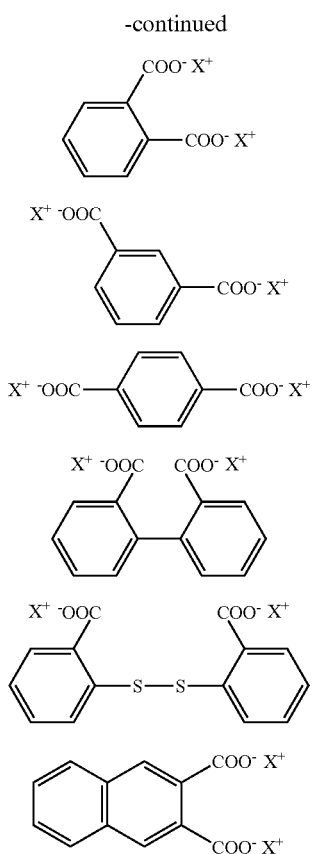

X⁺ in the specific examples denotes Na⁺, NH₄⁺, tetramethylammonium, or trimethylbenzylammonium.

In the present invention, at least one type of the salt of the weak acid having a pKa of 4 to 8 is used, and it may be used singly or in a combination of two or more types.

The content of (d) the salt of the weak acid having a pKa of 4 to 8 in the ink composition is preferably 0.01 to 10 wt % relative to the total solids content of the composition, more preferably 0.1 to 7 wt %, and yet more preferably 0.5 to 5 wt %. The solids content of the ink composition referred to in the present invention is for the components after excluding volatile components such as a solvent, which will be described later, from the ink composition.

It is preferable if the amount thereof added is in the above-mentioned range since the aging stability is greatly improved while maintaining high sensitivity.

(a) Cationically Polymerizable Compound

The cationically polymerizable compound (a) used in the present invention is not particularly limited as long as it is a compound that undergoes a polymerization reaction by virtue of an acid generated by the compound (b) that generates acid when exposed to radiation, which will be described later, and is cured, and various types of cationically polymerizable monomers known as photo-cationically polymerizable monomers may be used. Examples of the cationically polymerizable monomer include epoxy compounds, vinyl ether compounds, oxetane compounds described in JP-A-6-9714, JP-A-2001-31892, JP-A-2001-40068, JP-A-2001-55507, JP-A-2001-310938, JP-A-2001-310937, JP-A-2001-220526, etc.

Examples of the epoxy compounds include aromatic epoxides, alicyclic epoxides, and aliphatic epoxides.

Examples of the aromatic epoxide include di- or polyglycidyl ethers produced by a reaction between epichlorohydrin and a polyhydric phenol having at least one aromatic nucleus or an alkylene oxide adduct thereof; specific examples include di- or polyglycidyl ethers of bisphenol A or an alkylene oxide adduct thereof, di- or polyglycidyl ethers of hydrogenated bisphenol A or an alkylene oxide adduct thereof, and novolac type epoxy resins. Examples of the alkylene oxide above include ethylene oxide and propylene oxide.

Examples of the alicyclic epoxides include cyclohexene oxide- and cyclopentene oxide-containing compounds obtained by epoxidizing a compound having at least one cycloalkene ring such as a cyclohexene ring or a cyclopentene ring with an appropriate oxidizing agent such as hydrogen peroxide or a peracid.

Examples of the aliphatic epoxides include di- or polyglycidyl ethers of an aliphatic polyhydric alcohol or an alkylene oxide adduct thereof, and representative examples thereof include diglycidyl ethers of an alkylene glycol such as the diglycidyl ether of ethylene glycol, the diglycidyl ether of propylene glycol, and the diglycidyl ether of 1,6-hexanediol, polyglycidyl ethers of a polyhydric alcohol such as the di- or triglycidyl ether of glycerol or an alkylene oxide adduct thereof, and diglycidyl ethers of a polyalkylene glycol such as the diglycidyl ether of polyethylene glycol or an alkylene oxide adduct thereof and the diglycidyl ether of polypropylene glycol or an alkylene oxide adduct thereof. Examples of the alkylene oxide above include ethylene oxide and propylene oxide.

Detailed examples of monofunctional and polyfunctional epoxy compounds that can be used in the present invention are now given.

Examples of monofunctional epoxy compounds used in the present invention include phenyl glycidyl ether, p-tert-butylphenyl glycidyl ether, butyl glycidyl ether, 2-ethylhexyl glycidyl ether, allyl glycidyl ether, 1,2-butylene oxide, 1,3-butadiene monooxide, 1,2-epoxydodecane, epichlorohydrin, 1,2-epoxydecane, styrene oxide, cyclohexene oxide, 3-methacryloyloxymethylcyclohexene oxide, 3-acryloyloxymethylcyclohexene oxide, 3-vinylcyclohexene oxide, and 4-vinylcyclehexene oxide.

Furthermore, examples of polyfunctional epoxy compounds include bisphenol A diglycidyl ether, bisphenol F diglycidyl ether, bisphenol S diglycidyl ether, brominated bisphenol A diglycidyl ether, brominated bisphenol F diglycidyl ether, brominated bisphenol S diglycidyl ether, epoxy novolac resins, hydrogenated bisphenol A diglycidyl ether, hydrogenated bisphenol F diglycidyl ether, hydrogenated bisphenol S diglycidyl ether, 3,4-epoxycyclohexenylmethyl-3',4'-epoxycyclohexenecarboxylate, 2-(3,4-epoxycyclohexyl-5,5-spiro-3,4-epoxy)cyclohexane-meta-dioxane, bis(3,4-epoxycyclohexylmethyl) adipate, bis(3,4-epoxy-6-methylcyclohexylmethyl) adipate, 3,4-epoxy-6-methylcyclohexenyl 3',4'-epoxy-6'-methylcyclohexenecarboxylate, methylenebis(3,4-epoxycyclohexane), dicyclopentadiene diepoxide, the di(3,4-epoxycyclohexylmethyl) ether of ethylene glycol, ethylene bis(3,4-epoxycyclohexanecarboxylate), dioctyl epoxyhexahydrophthalate, di-2-ethylhexyl epoxyhexahydrophthalate, 1,4-butanediol diglycidyl ether, 1,6-hexanediol diglycidyl ether, glycerol triglycidyl ether, trimethylolpropane triglycidyl ether, polyethylene glycol diglycidyl ether, polypropylene glycol diglycidyl ether, 1,13-tetradecadiene dioxide, limonene dioxide, 1,2,7,8-diepoxyoctane, and 1,2,5,6-diepoxycyclooctane.

Among these epoxy compounds, the aromatic epoxides and the alicyclic epoxides are preferable from the viewpoint of excellent curing speed, and the alicyclic epoxides are particularly preferable.

Examples of the vinyl ether compounds include di- or tri-vinyl ether compounds such as ethylene glycol divinyl ether, diethylene glycol divinyl ether, triethylene glycol divinyl ether, propylene glycol divinyl ether, dipropylene glycol divinyl ether, butanediol divinyl ether, hexanediol divinyl ether, cyclohexanedimethanol divinyl ether, and trimethylolpropane trivinyl ether, and monovinyl ether compounds such as ethyl vinyl ether, n-butyl vinyl ether, isobutyl vinyl ether, octadecyl vinyl ether, cyclohexyl vinyl ether, hydroxybutyl vinyl ether, 2-ethylhexyl vinyl ether, cyclohexanedimethanol monovinyl ether, n-propyl vinyl ether, isopropyl vinyl ether, isopropenyl vinyl ether-O-propylene carbonate, dodecyl vinyl ether, and diethylene glycol monovinyl ether.

Detailed examples of monofunctional vinyl ethers and polyfunctional vinyl ethers are given below.

Specific examples of monofunctional vinyl ethers include methyl vinyl ether, ethyl vinyl ether, propyl vinyl ether, n-butyl vinyl ether, t-butyl vinyl ether, 2-ethylhexyl vinyl ether, n-nonyl vinyl ether, lauryl vinyl ether, cyclohexyl vinyl ether, cyclohexylmethyl vinyl ether, 4-methylcyclohexylmethyl vinyl ether, benzyl vinyl ether, dicyclopentenyl vinyl ether, 2-dicyclopentenoxyethyl vinyl ether, methoxyethyl vinyl ether, ethoxyethyl vinyl ether, butoxyethyl vinyl ether, methoxyethoxyethyl vinyl ether, ethoxyethoxyethyl vinyl ether, methoxypolyethylene glycol vinyl ether, tetrahydrofurfuryl vinyl ether, 2-hydroxyethyl vinyl ether, 2-hydroxypropyl vinyl ether, 4-hydroxybutyl vinyl ether, 4-hydroxymethylcyclohexylmethyl vinyl ether, diethylene glycol monovinyl ether, polyethylene glycol vinyl ether, chloroethyl vinyl ether, chlorobutyl vinyl ether, chloroethoxyethyl vinyl ether, phenylethyl vinyl ether, and phenoxypolyethylene glycol vinyl ether.

Furthermore, examples of polyfunctional vinyl ethers include divinyl ethers such as ethylene glycol divinyl ether, diethylene glycol divinyl ether, polyethylene glycol divinyl ether, propylene glycol divinyl ether, butylene glycol divinyl ether, hexanediol divinyl ether, bisphenol A alkylene oxide divinyl ether, and bisphenol F alkylene oxide divinyl ether; and polyfunctional vinyl ethers such as trimethylolethane trivinyl ether, trimethylolpropane trivinyl ether, ditrimethylolpropane tetravinyl ether, glycerol trivinyl ether, pentaerythritol tetravinyl ether, dipentaerythritol pentavinyl ether, dipentaerythritol hexavinyl ether, an ethylene oxide adduct of trimethylolpropane trivinyl ether, a propylene oxide adduct of trimethylolpropane trivinyl ether, an ethylene oxide adduct of ditrimethylolpropane tetravinyl ether, a propylene oxide adduct of ditrimethylolpropane tetravinyl ether, an ethylene oxide adduct of pentaerythritol tetravinyl ether, a propylene oxide adduct of pentaerythritol tetravinyl ether, an ethylene oxide adduct of dipentaerythritol hexavinyl ether, and a propylene oxide adduct of dipentaerythritol hexavinyl ether.

As the vinyl ether compound, the di- or tri-vinyl ether compounds are preferable from the viewpoint of curability, adhesion to a recording medium, surface hardness of the image formed, etc., and the divinyl ether compounds are particularly preferable.

The oxetane compound in the present invention means a compound having at least one oxetane ring, and may be selected freely from known oxetane compounds such as those described in JP-A-2001-220526, JP-A-2001-310937, and JP-A-2003-341217.

As the compound having an oxetane ring that can be used in the ink composition of the present invention, a compound having 1 to 4 oxetane rings in the structure is preferable. In accordance with use of such a compound, it becomes easy to maintain the viscosity of the ink composition in a range that gives good handling properties and, furthermore, the cured ink can be given high adhesion to the recording medium, which is preferable.

Examples of compounds having 1 to 2 oxetane rings in the molecule include compounds represented by Formulae (1) to (3) below.

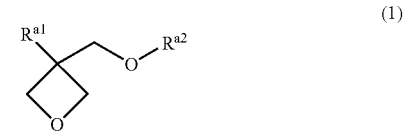

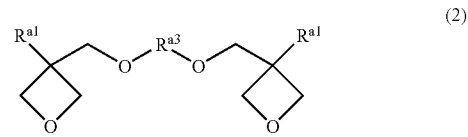

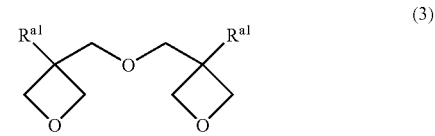

$R^{a1}$ denotes a hydrogen atom, an alkyl group having 1 to 6 carbons, a fluoroalkyl group having 1 to 6 carbons, an allyl group, an aryl group, a furyl group, or a thienyl group. When there are two $R^{a1}$ in the molecule, they may be identical to or different from each other.

Examples of the alkyl group include a methyl group, an ethyl group, a propyl group, and a butyl group, and preferred examples of the fluoroalkyl group include those obtained by substituting any of the hydrogen atoms of the above alkyl groups with a fluorine atom.

$R^{a2}$ denotes a hydrogen atom, an alkyl group having 1 to 6 carbons, an alkenyl group having 2 to 6 carbons, a group having an aromatic ring, an alkylcarbonyl group having 2 to 6 carbons, an alkoxycarbonyl group having 2 to 6 carbons, or an N-alkylcarbamoyl group having 2 to 6 carbons. Examples of the alkyl group include a methyl group, an ethyl group, a propyl group, and a butyl group, examples of the alkenyl group include a 1-propenyl group, a 2-propenyl group, a 2-methyl-1-propenyl group, a 2-methyl-2-propenyl group, a 1-butenyl group, a 2-butenyl group, and a 3-butenyl group, and examples of the group having an aromatic ring include a phenyl group, a benzyl group, a fluorobenzyl group, a methoxybenzyl group, and a phenoxyethyl group. Examples of the alkylcarbonyl group include an ethylcarbonyl group, a propylcarbonyl group, and a butylcarbonyl group, examples of the alkoxycarbonyl group include an ethoxycarbonyl group, a propoxycarbonyl group, and a butoxycarbonyl group, and examples of the N-alkylcarbamoyl group include an ethylcarbamoyl group, a propylcarbamoyl group, a butylcarbamoyl group, and a pentylcarbamoyl group. Furthermore, it is possible for $R^2$ to have a substituent, and the examples of the substituent include alkyl group, having 1 to 6 carbons and fluorine atom.

$R^{a3}$ denotes a linear or branched alkylene group, a linear or branched poly(alkyleneoxy) group, a linear or branched unsaturated hydrocarbon group, a carbonyl group, a carbonyl group-containing alkylene group, a carboxyl group-containing alkylene group, a carbamoyl group-containing alkylene group, or a group shown below. Examples of the alkylene group include an ethylene group, a propylene group, and a butylene group, and examples of the poly(alkyleneoxy) group include a poly(ethyleneoxy) group and a poly(propyleneoxy) group. Examples of the unsaturated hydrocarbon group include a propenylene group, a methylpropenylene group, and a butenylene group.

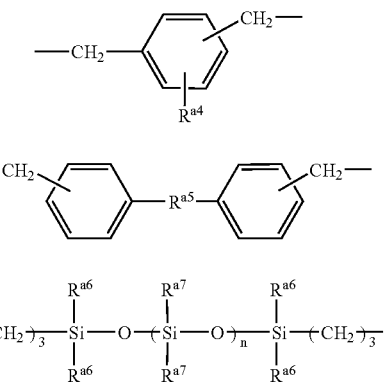

When $R^{a3}$ is the above-mentioned polyvalent group, $R^{a4}$ denotes a hydrogen atom, an alkyl group having 1 to 4 carbons, an alkoxy group having 1 to 4 carbons, a halogen atom, a nitro group, a cyano group, a mercapto group, a lower alkylcarboxyl group, a carboxyl group, or a carbamoyl group.

$R^{a5}$ denotes an oxygen atom, a sulfur atom, a methylene group, NH, SO, $SO_2$, $C(CF_3)_2$, or, $C(CH_3)_2$.

$R^{a6}$ denotes an alkyl group having 1 to 4 carbons or an aryl group, and n is an integer of 0 to 2,000. $R^{a7}$ denotes an alkyl group having 1 to 4 carbons, an aryl group, or a monovalent group having the structure below. In the formula, $R^{a8}$ denotes an alkyl group having 1 to 4 carbons or an aryl group, and m is an integer of 0 to 100.

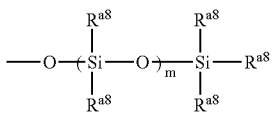

Examples of the compound represented by Formula (1) include 3-ethyl-3-hydroxymethyloxetane (OXT-101: manufactured by Toagosei Co., Ltd.), 3-ethyl-3-(2-ethylhexyloxymethyl)oxetane (OXT-212: manufactured by Toagosei Co., Ltd.), and 3-ethyl-3-phenoxymethyloxetane (OXT-211: manufactured by Toagosei Co., Ltd.). Examples of the compound represented by Formula (2) include 1,4-bis[(3-ethyl-3-oxetanylmethoxy)methyl]benzene (OXT-121: Toagosei Co., Ltd.). Examples of the compound represented by Formula (3) include bis(3-ethyl-3-oxetanylmethyl) ether (OXT-221: Toagosei Co., Ltd.).

Examples of the compound having 3 to 4 oxetane rings in the molecule include compounds represented by Formula (4) below.

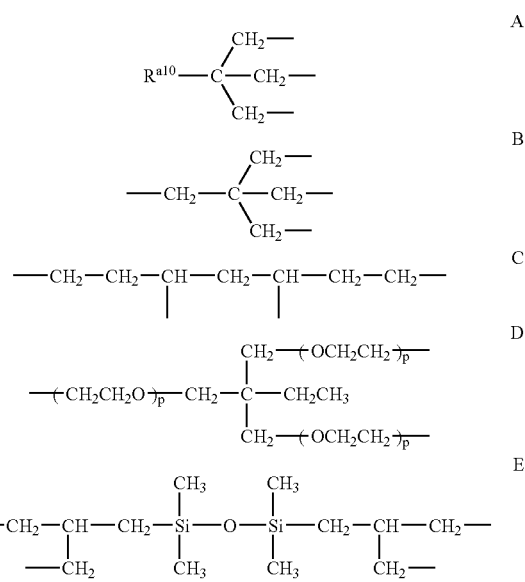

In Formula (4), $R^{a1}$ denotes the same as in Formula (1) above. Furthermore, examples of $R^{a9}$, which is a polyvalent linking group, include a branched alkylene group having 1 to 12 carbons such as a group represented by A to C below, a branched poly(alkyleneoxy) group such as a group represented by D below, and a branched polysiloxane group such as a group represented by E below. j is 3 or 4.

In the above A, $R^{a10}$ denotes a methyl group, an ethyl group, or a propyl group. Furthermore, in the above D, p is an integer of 1 to 10.

Moreover, as another embodiment of the oxetane compound that can be suitably used in the present invention, a compound having an oxetane ring on a side chain, represented by Formula (5) below, can be cited.

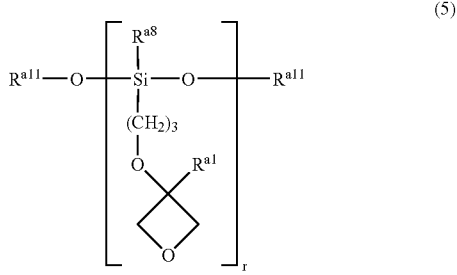

In Formula (5), $R^{a1}$ and $R^{a8}$ denote the same as in the above-mentioned formulae. $R^{a11}$ is an alkyl group having 1 to 4 carbons such as a methyl group, an ethyl group, a propyl group, or a butyl group, or a trialkylsilyl group, and r is 1 to 4.

Such compounds having an oxetane ring are described in detail in paragraph Nos. [0021] to [0084] of JP-A-2003-341217 above, and the compounds described here may be suitably used in the present invention.

The oxetane compounds described in JP-A-2004-91556 can be used in the present invention. The details are described in paragraph Nos. [0022] to [0058].

Among the oxetane compounds used in the present invention, from the viewpoint of ink composition viscosity and tackiness, it is preferable to use a compound having one oxetane ring.

The ink composition of the present invention may comprise only one type of cationically polymerizable compound (a) or two or more types thereof in combination, but from the viewpoint of suppressing effectively shrinkage during ink curing, it is preferable to use a combination of a vinyl ether compound and at least one type of compound selected from the oxetane compounds and the epoxy compounds.

The content of the cationically polymerizable compound (a) in the ink composition is suitably in the range of 10 to 95 wt % relative to the total solids content of the composition, preferably 30 to 90 wt %, and more preferably 50 to 85 wt %.

Compound (b) that Generates Acid when Exposed to Radiation

The ink composition of the present invention comprises the compound (b) that generates an acid when exposed to radiation (also called the photo-acid generator as appropriate).

As the photo-acid generator used in the present invention of the ink composition, a cationic photopolymerization photoinitiator, a radical photopolymerization photoinitiator, a photo-decolorizing agent or a photo-discoloring agent for a dye, or a compound that generates an acid when exposed to light used in a microresist, etc. (ultraviolet light at 400 to 200 nm, far ultraviolet light, particularly preferably, g-line, h-line, i-line, KrF excimer laser light), ArF excimer laser light, an electron beam, X rays, a molecular beam, or an ion beam, may be used by appropriately selecting therefrom.

Examples of such a photo-acid generator include onium salt compounds such as diazonium salts, phosphonium salts, sulfonium salts, and iodonium salts, and sulfonate compounds such as imidosulfonates, oxime sulfonates, diazodisulfones, disulfones, and o-nitrobenzylsulfonates, which generate an acid by decomposition when exposed to radiation.

Other specific examples of the compound that generates an acid when exposed to actinic light or radiation, which can be used in the present invention, include diazonium salts disclosed in, for instance, S. I. Schlesinger, Photogr. Sci. Eng., 1974, 18:387 and T. S. Bal et al., Polymer, 1980, 21:423; ammonium salts disclosed in, for instance, U.S. Pat. Nos. 4,069,055, 4,069,056 and JP-A-3-140140; phosphonium salts disclosed in, for instance, D. C. Necker et al., Macromolecules, 1984, 17:2468, C. S. Wen et al., The. Proc. Conf. Rad. Curing ASIA, p. 478, Tokyo, Oct. (1988) and U.S. Pat. Nos. 4,069,055 and 4,069,056; iodonium salts disclosed in, for instance, J. V. Crivello et al., Macromolecules, 10 (6), 1307 (1977), Chem. Eng. News, Nov. 28, p. 31 (1988), European Patent No. 104,143 and JP-A-2-150848 and JP-A-2-296514;

sulfonium salts disclosed in, for instance, J. V. Crivello et al., Polymer J., 1985, 17:73, J. V. Crivello et al., J. Org. Chem., 1978, 43:3055, W. R. Watt et al., J. Polymer Sci., Polymer Chem. Ed., 1984, 22:1789, J. V. Crivello et al., Polymer Bull., 1985, 14:279, J. V. Crivello et al., Macromolecules, 14(5), 1141 (1981), J. V. Crivello et al., J. Polymer Sci., Polymer Chem. Ed., 1979, 17:2877, European Patent Nos. 370,693, 161,811, 410,201, 339,049, 233,567, 297,443 and 297,442, U.S. Pat. Nos. 3,902,114, 4,933,377, 4,760,013, 4,734,444 and 2,833,827 and German Patent Nos. 2,904,626, 3,604,580 and 3,604,581, JP-A-7-28237, and JP-A-8-27102;

selenonium salts disclosed in, for instance, J. V. Crivello et al., Macromolecules, 10(6), 1307 (1977) and J. V. Crivello et al., J. Polymer Sci., Polymer Chem. Ed., 1979, 17:1047; onium salts such as arsonium salts disclosed in, for instance, C. S. Wen et al., The Proc. Conf. Rad. Curing ASIA, p. 478, Tokyo, Oct. (1988); organic halogen-containing compounds disclosed in, for instance, U.S. Pat. No. 3,905,815, JP-B-46-4605, JP-A-48-36281, JP-A-55-32070, JP-A-60-239736, JP-A-61-169835, JP-A-61-169837, JP-A-62-58241, JP-A-62-212401, JP-A-63-70243 and JP-A-63-298339; organometallic/organic halogen-containing compounds disclosed in, for instance, K. Meier et al., J. Rad. Curing, 13(4), 26 (1986), T. P. Gill et al., Inorg. Chem., 1980, 19:3007, D. Astruc, Acc. Chem. Res., 19(12), 377 (1986) and JP-A-2-161445;

photo-acid generators comprising o-nitrobenzyl type protecting group disclosed in, for instance, S. Hayase et al., J. Polymer Sci., 1987, 25:753, E. Reichmanis et al., J. Polymer Sci., Polymer Chem. Ed., 1985, 23:1, Q. Q. Zhu et al., J. Photochem., 36, 85, 39, 317 (1987), B. Amit et al., Tetrahedron Lett., (24), 2205 (1973), D. H. R. Barton et al., J. Chem. Soc., 3571 (1965), P. M. Collins et al., J. Chem. Soc., Perkin 1, 1695 (1975), M. Rudinstein et al., Tetrahedron Lett., (17), 1445 (1975), J. W. Walker et al., J. Am. Chem. Soc., 110, 7170 (1988), S. C. Busman et al., J. Imaging Technol., 11(4), 191 (1985), H. M. Houlihan et al., Macromolecules, 21, 2001 (1988), P. M. Collins et al., J. Chem. Soc., Chem. Commun., 532 (1972), S. Hayase et al., Macromolecules, 18, 1799 (1985), E. Reichmanis et al., J. Electrochem. Soc., Solid State Sci. Technol., 130(6), F. M. Houlihan et al., Macromolecules, 21, 2001 (1988), European Patent Nos. 0,290,750, 046,083, 156,535, 271,851 and 0,388,343, U.S. Pat. Nos. 3,901,710 and 4,181,531 and JP-A-60-198538 and JP-A-53-133022;

compounds producing sulfonic acids by photolysis which are represented by iminosulfonates described in M. Tunooka et al., Polymer Preprints Japan, 35 (8), G. Berner et al., J. Rad. Curing, 13 (4), W. J. Mijs et al., Coating Technol., 55 (697), 45 (1983), Akzo, H. Adachi et al., Polymer Preprints Japan, 37 (3), European Patents 0,199,672, 84,515, 044,115, 618,564, and 0,101,122, U.S. Pat. Nos. 4,371,605 and 4,431,774, JP-A-64-18143, JP-A-2-245756 and JP-A-3-140109; and disulfone compounds described in JP-A-61-166544 and JP-A-2-71270; and diazoketosulfone and diazodisulfone compounds described in JP-A-3-103854, JP-A-3-103856, and JP-A-4-210960.

Further, compounds in which these photo-acid generating groups or compounds are introduced into their main chains or side chains can be used. Examples of such compounds are described in M. E. Woodhouse et al., J. Am. Chem. Soc., 104, 5586 (1982), S. P. Pappas et al., J. Imaging Sci., 30 (5), 218 (1986), S. Kondo et al., Makromol. Chem., Rapid Commun., 9, 625 (1988), Y. Yamada et al., Makromol. Chem., 152, 153, 163 (1972), J. V. Crivello et al., J. Polymer Sci., Polymer Chem. Ed., 17, 3845 (1979), U.S. Pat. No. 3,849,137, German Patent 3,914,407, JP-A-63-26653, JP-A-55-164824, JP-A-62-69263, JP-A-63-146038, JP-A-63-163452, JP-A-62-153853 and JP-A-63-146029. Examples thereof include onium salt compounds such as diazonium salts, ammonium salts, phosphonium salts, iodonium salts, sulfonium salts, selenonium salts, and arsonium salts; organic halogen compounds; organometallic/organohalides; photo-acid generators having an o-nitrobenzyl type protecting group; compounds that generate a sulfonic acid by photodecomposition, represented by iminosulfonates; disulfone compounds; diazoketosulfones; and diazodisulfone compounds.

Further, there can also be used compounds that generate an acid with light which are described in V. N. R. Pillai, Synthesis, (1) 1 (1980), A. Abad et al., Tetrahedron Lett., (47), 4555 (1971), D. H. R. Barton et al., J. Chem. Soc., (C), 329 (1970), U.S. Pat. No. 3,779,778 and European Patent No. 126,712.

Preferred examples of the photo-acid generator that can be used in the present invention include compounds represented by Formulae (b1), (b2), and (b3) below.

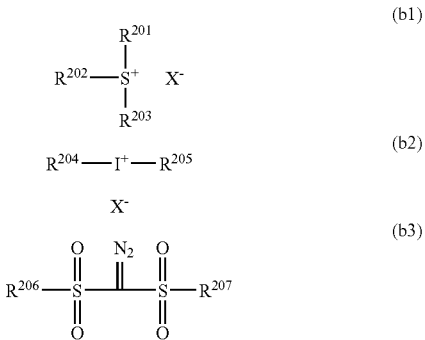

In Formula (b1), $R^{201}$, $R^{202}$, and $R^{203}$ independently denote an organic group.

$X^-$ denotes a non-nucleophilic anion; preferred examples thereof include a sulfonic acid anion, a bis(alkylsulfonyl)amide anion, a tris(alkylsulfonyl)methide anion, $BF_4^-$, $PF_6^-$, $SbF_6^-$, and groups shown below, and an organic anion having a carbon atom is preferable.

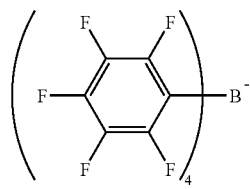

Preferred examples of the organic anion include organic anions represented by the formulae below.

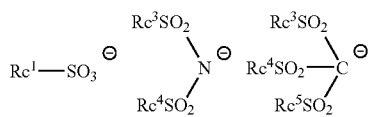

$Rc^1$ denotes an organic group.

Examples of the organic group denoted by $Rc^1$ include those having 1 to 30 carbons, and preferred examples thereof include an alkyl group, a cycloalkyl group, an aryl group, and a group formed by connecting a plurality of the above groups via a linking group such as a single bond, —O—, —$CO_2$—, —S—, —$SO_3$—, or —$SO_2N(Rd^1)$—.

$Rd^1$ denotes a hydrogen atom or an alkyl group.

$Rc^3$, $Rc^4$, and $Rc^5$ independently denote an organic group.

With regard to the organic groups denoted by $Rc^3$, $Rc^4$, and $Rc^5$, those cited as preferred examples for the organic group denoted by $Rc^1$ are cited here, and a perfluoroalkyl group having 1 to 4 carbons is most preferable.

$Rc^3$ and $Rc^4$ may be bonded to form a ring.

Examples of a group formed by bonding of $Rc^3$ and $Rc^4$ include an alkylene group and an arylene group. It is preferably a perfluoroalkylene group having 2 to 4 carbons.

The most preferred examples of the organic groups denoted by $Rc^1$, and $Rc^3$ to $Rc^5$, include an alkyl group whose 1 position has been substituted with a fluorine atom or a fluoroalkyl group, and a phenyl group substituted with a fluorine atom or a fluoroalkyl group. Introducing a fluorine atom or a fluoroalkyl group increases the acidity of an acid generated on exposure to light, thus improving the sensitivity.

The number of carbons of the organic groups denoted by $R^{201}$, $R^{202}$, and $R^{203}$ is preferably 1 to 30, and more preferably 1 to 20.

Furthermore, two of $R^{201}$ to $R^{203}$ may be bonded to form a ring structure, and an oxygen atom, a sulfur atom, an ester bond, an amide bond, or a carbonyl group may be contained in the ring. Examples of the group formed by bonding of two of $R^{201}$ to $R^{203}$ include alkylene groups (e.g. a butylene group and a pentylene group).

Specific examples of the organic groups denoted by $R^{201}$, $R^{202}$, and $R^{203}$ are the corresponding groups in compounds (b1-1), (b1-2), and (b1-3), which will be described later.

The photo-acid generator may be a compound having a plurality of structures represented by Formula (b1). For example, it may be a compound having a structure in which at least one of $R^{201}$ to $R^{203}$ of a compound represented by Formula (b1) is bonded directly or via a linking group to at least one of $R^{201}$ to $R^{203}$ of a compound represented by Formula (b1).

Yet more preferred examples of the component (b1) include compounds (b1-1), (b1-2), and (b1-3), which are explained below.

The compound (b1-1) is an arylsulfonium compound in which at least one of $R^{201}$ to $R^{203}$ of the Formula (b1) above is an aryl group, that is, a compound having arylsulfonium as a cation.

With regard to the arylsulfonium compound, all of $R^{201}$ to $R^{203}$ may be aryl groups, or some of $R^{201}$ to $R^{203}$ may be an aryl group and the rest may be an alkyl group or a cycloalkyl group.

Examples of the arylsulfonium compound include a triarylsulfonium compound, a diarylalkylsulfonium compound, an aryldialkylsulfonium compound, a diarylcycloalkylsulfonium compound, and an aryldicycloalkylsulfonium compound.

With regard to the aryl group of the arylsulfonium compound, an aryl group such as a phenyl group or a naphthyl group and a heteroaryl group such as an indole residue or a pyrrole residue are preferable, and a phenyl group and an indole residue are more preferable. When the aryl sulfonium compound has two or more aryl groups, two or more of the aryl groups may be identical to or different from each other.

The alkyl group that the arylsulfonium compound may have as necessary is preferably a straight-chain or branched alkyl group having 1 to 15 carbons, and examples thereof include a methyl group, an ethyl group, a propyl group, an n-butyl group, a sec-butyl group, and a t-butyl group.

The cycloalkyl group that the arylsulfonium compound may have as necessary is preferably a cycloalkyl group having 3 to 15 carbons, and examples thereof include a cyclopropyl group, a cyclobutyl group, and a cyclohexyl group.

The aryl group, the alkyl group, and the cycloalkyl group denoted by $R^{201}$ to $R^{203}$ may have as a substituent an alkyl group (e.g. having 1 to 15 carbons), a cycloalkyl group (e.g. having 3 to 15 carbons), an aryl group (e.g. having 6 to 14 carbons), an alkoxy group (e.g. having 1 to 15 carbons), a halogen atom, a hydroxyl group, or a phenylthio group. Preferred examples of the substituent include a straight-chain or branched alkyl group having 1 to 12 carbons, a cycloalkyl group having 3 to 12 carbons, and a straight-chain, branched, or cyclic alkoxy group having 1 to 12 carbons, and the most preferable examples include an alkyl group having 1 to 4 carbons and an alkoxy group having 1 to 4 carbons. One of $R^{201}$ to $R^{203}$ may be substituted or all thereof may be substituted. When $R^{201}$ to $R^{203}$ are aryl groups, it is preferable for the substituent to be present at the p-position of the aryl group.

The compound (b1-2) is now explained.

The compound (b1-2) is a compound in which $R^{201}$ to $R^{203}$ of Formula (b1) independently denote an organic group having no aromatic ring. The aromatic ring referred to here includes an aromatic ring containing a hetero atom.

The organic group having no aromatic ring denoted by $R^{201}$ to $R^{203}$ preferably has 1 to 30 carbons, and more preferably 1 to 20 carbons.

$R^{201}$ to $R^{203}$ preferably independently denote an alkyl group, a cycloalkyl group, an allyl group, or a vinyl group, more preferably a straight-chain, branched, or cyclic 2-oxoalkyl group or alkoxycarbonylmethyl group, and particularly preferably a straight-chain or branched 2-oxoalkyl group.

The alkyl group denoted by $R^{201}$ to $R^{203}$ may be a straight-chain or branched, is preferably a straight-chain or branched alkyl group having 1 to 10 carbons (e.g. a methyl group, an ethyl group, a propyl group, a butyl group, and a pentyl group), and is more preferably a straight-chain or branched 2-oxoalkyl group or an alkoxycarbonylmethyl group.

The cycloalkyl group denoted by $R^{201}$ to $R^{203}$ may preferably be a cycloalkyl group having 3 to 10 carbons (a cyclopentyl group, a cyclohexyl group, or a norbornyl group), and a cyclic 2-oxoalkyl group is more preferable.

The straight-chain, branched, or cyclic 2-oxoalkyl group denoted by $R^{201}$ to $R^{203}$ may preferably be the above-mentioned alkyl group or cycloalkyl group in which there is >C=O at the 2-position.

Preferred examples of the alkoxy group of the alkoxycarbonylmethyl group denoted by $R^{201}$ to $R^{203}$ include an alkoxy group having 1 to 5 carbons (a methoxy group, an ethoxy group, a propoxy group, a butoxy group, and a pentoxy group).

$R^{201}$ to $R^{203}$ may further be substituted with a halogen atom, an alkoxy group (e.g. having 1 to 5 carbons), a hydroxyl group, a cyano group, or a nitro group.

The compound (b1-3) referred to is a compound represented by Formula (b1-3) below and is a compound having a phenacylsulfonium salt structure.

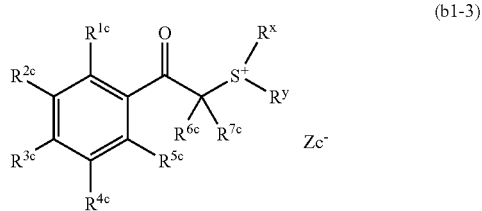

(b1-3)

In Formula (b1-3), $R^{1c}$ to $R^{5c}$ independently denote a hydrogen atom, an alkyl group, a cycloalkyl group, an alkoxy group, or a halogen atom.

$R^{6c}$ and $R^{7c}$ independently denote a hydrogen atom, an alkyl group, or a cycloalkyl group.

$R^x$ and $R^y$ independently denote an alkyl group, a cycloalkyl group, an allyl group, or a vinyl group.

Any two or more of $R^{1c}$ to $R^{5c}$, $R^{6c}$ and $R^{7c}$, and $R^x$ and $R^y$ may be bonded together to form a ring structure.

$Zc^-$ denotes a non-nucleophilic anion, and the same examples as those of the non-nucleophilic anion $X^-$ in Formula (b1) may be cited.

The alkyl group denoted by $R^{1c}$ to $R^{7c}$ may be either a straight-chain alkyl group or a branched alkyl group, and preferred examples thereof include straight-chain and branched alkyl groups having 1 to 20 carbons, and more preferably 1 to 12 carbons (e.g. a methyl group, an ethyl group, a straight-chain or branched propyl group, a straight-chain or branched butyl group, and a straight-chain or branched pentyl group).

Preferred examples of the cycloalkyl group denoted by $R^{1c}$ to $R^{7c}$ include cycloalkyl groups having 3 to 8 carbons (e.g. a cyclopentyl group and a cyclohexyl group).

The alkoxy group denoted by $R^{1c}$ to $R^{5c}$ may be any of a straight-chain, branched, or cyclic alkoxy group; examples thereof include alkoxy groups having 1 to 10 carbons, and preferably straight-chain or branched alkoxy groups having 1 to 5 carbons (e.g. a methoxy group, an ethoxy group, a straight-chain or branched propoxy group, a straight-chain or branched butoxy group, and a straight-chain or branched pentoxy group), and cyclic alkoxy groups having 3 to 8 carbons (e.g. a cyclopentyloxy group and a cyclohexyloxy group).

Examples of the group formed by bonding any two or more of $R^{1c}$ to $R^{5c}$, $R^{6c}$ and $R^{7c}$, and $R^x$ and $R^y$ include a butylene group and a pentylene group. This cyclic structure may contain an oxygen atom, a sulfur atom, an ester bond, or an amide bond.

It is preferable for any one of $R^{1c}$ to $R^{5c}$ to be a straight-chain or branched alkyl group, a cycloalkyl group, or a straight-chain, branched, or cyclic alkoxy group, and it is more preferable that the sum of the number of carbons of $R^{1c}$ to $R^{5c}$ is 2 to 15. This is preferable since the solvent solubility further improves and the occurrence of particles during storage is suppressed.

Examples of the alkyl groups and the cycloalkyl groups denoted by $R^x$ and $R^y$ may be the same as those of the alkyl groups and the cycloalkyl groups denoted by $R^{1c}$ to $R^{7c}$.

$R^x$ and $R^y$ are preferably 2-oxoalkyl groups or alkoxycarbonylmethyl groups.

Examples of the 2-oxoalkyl group include a group in which the alkyl group or the cycloalkyl group denoted by $R^{1c}$ to $R^{5c}$ has >C=O at the 2-position.

Examples of the alkoxy group of the alkoxycarbonylmethyl group may be the same as those of the alkoxy group denoted by $R^{1c}$ to $R^{5c}$.

$R^x$ and $R^y$ are preferably alkyl groups or cycloalkyl groups having 4 or more carbons, more preferably alkyl groups or cycloalkyl groups having 6 or more carbons, and yet more preferably 8 or more carbons.

$R^{204}$ to $R^{207}$ in Formulae (b2) and (b3) independently denote an aryl group, an alkyl group, or a cycloalkyl group. $X^-$ denotes a non-nucleophilic anion, and examples thereof include those that are the same as the non-nucleophilic anion $X^-$ in Formula (b1).

The aryl group denoted by $R^{204}$ to $R^{207}$ is preferably a phenyl group or a naphthyl group, and more preferably a phenyl group.

The alkyl group denoted by $R^{204}$ to $R^{207}$ may be either a straight-chain or a branched alkyl group, and preferred examples thereof include straight-chain or branched alkyl groups having 1 to 10 carbons (e.g. a methyl group, an ethyl group, a propyl group, a butyl group, and a pentyl group). Preferred examples of the cycloalkyl groups denoted by $R^{204}$ to $R^{207}$ include cycloalkyl groups having 3 to 10 carbons (a cyclopentyl group, a cyclohexyl group, and a norbornyl group).

Examples of the substituents that are present on $R^{204}$ to $R^{207}$ include an alkyl group (e.g. having 1 to 15 carbons), a cycloalkyl group (e.g. having 3 to 15 carbons), an aryl group (e.g. having 6 to 15 carbons), an alkoxy group (e.g. having 1 to 15 carbons), a halogen atom, a hydroxyl group, and a phenylthio group.

Furthermore, $R^{204}$ and $R^{205}$, $R^{206}$ and $R^{207}$ may be bonded to form a ring structure, and an oxygen atom, a sulfur atom, an ester bond, an amide bond, or a carbonyl group may be contained in the ring. Examples of the groups formed by bonding of $R^{204}$ and $R^{205}$ or $R^{206}$ and $R^{207}$ include an alkylene group (e.g. a butylene group and a pentylene group).

The photo-acid generator may be a compound having a plurality of the structures represented by Formula (b2) or (b3). For example, it may be a compound having a structure in which $R^{204}$ or $R^{205}$ of one compound represented by Formula (b2) is bonded directly or via a linking group to $R^{204}$ or $R^{205}$ of another compound represented by Formula (b2).

Examples of the compound that generates an acid when exposed to actinic light or radiation further include compounds represented by Formulae (b4), (b5), and (b6) below.

(b4)

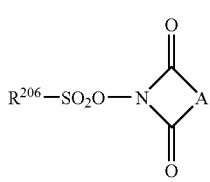
(b5)

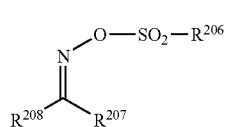
(b6)

In Formula (b4) to (b6), $Ar^3$ and $Ar^4$ independently denote an aryl group.

$R^{206}$, $R^{207}$ and $R^{208}$ independently denote an alkyl group, a cycloalkyl group, an aryl group, or a cyano group.

A denotes an alkylene group, an alkenylene group, or an arylene group.

$Ar^3$ and $Ar^4$, $R^{206}$ to $R^{208}$, and A may have a substituent, and examples thereof include an alkyl group (e.g. having 1 to 15 carbons), a cycloalkyl group (e.g. having 3 to 15 carbons), an aryl group (e.g. having 6 to 15 carbons), an alkoxy group (e.g. having 1 to 15 carbons), a halogen atom, a hydroxyl group, and a phenylthio group.

The photo-acid generator may be a compound having a plurality of structures represented by Formulae (b4) to (b6). For example, it may be a compound having a structure in which at least one of $R^{206}$ to $R^{208}$ of a compound represented by Formula (b6) is bonded directly or via a linking group to at least one of $R^{206}$ to $R^{208}$ of another compound represented by Formula (b6).

Among the above-mentioned photo-acid generators, compounds represented by Formulae (b1) to (b3) are preferable.

Preferred compound examples (b-1) to (b-96) of the photo-acid generator (b) used in the present invention are cited below, but the present invention should not be construed by being limited thereto.

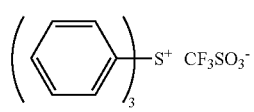
(b-1)

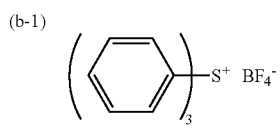
(b-2)

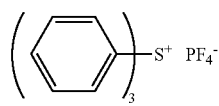
(b-3)

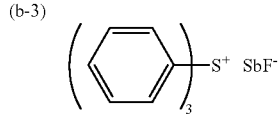
(b-4)

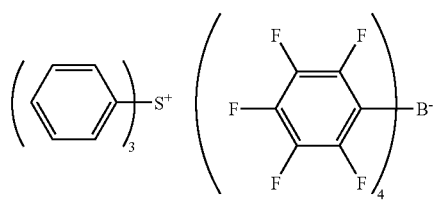
(b-5)

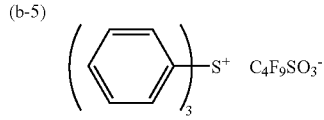
(b-6)

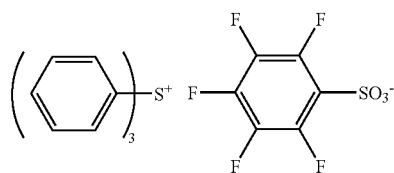
(b-7)

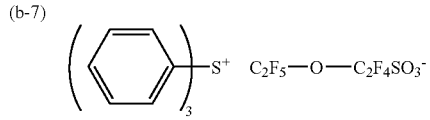
(b-8)

-continued
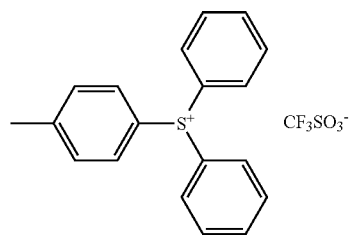
(b-9)
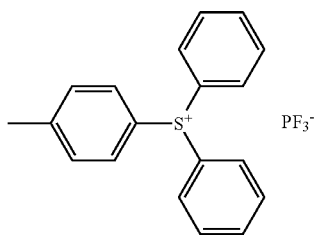
(b-10)
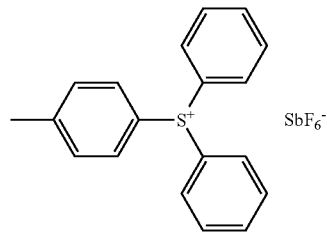
(b-11)
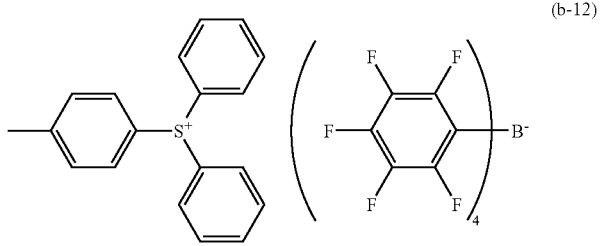
(b-12)
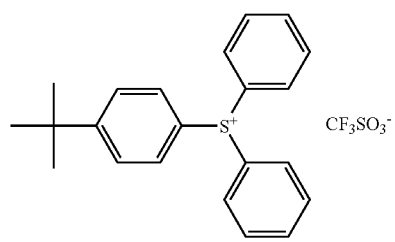
(b-13)
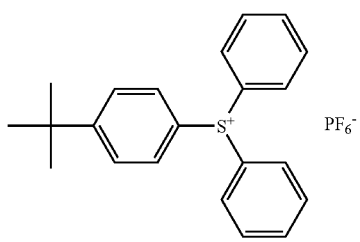
(b-14)
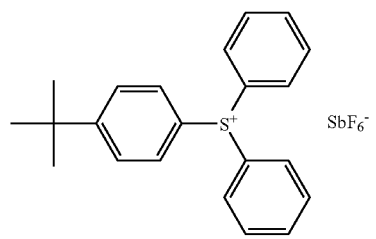
(b-15)
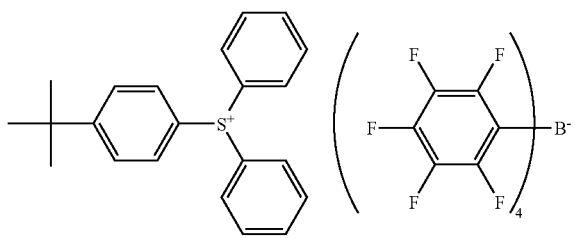
(b-16)
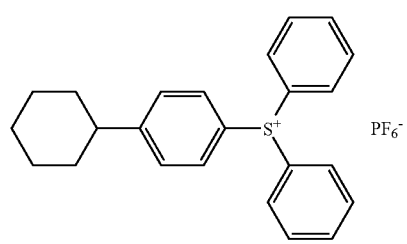
(b-17)
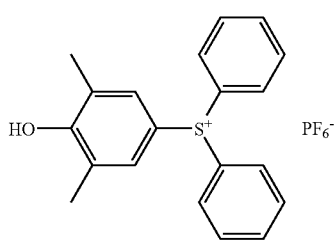
(b-18)
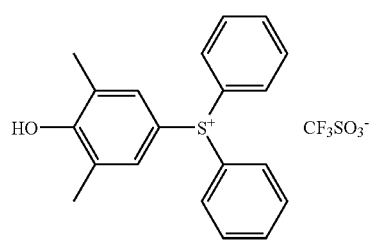
(b-19)
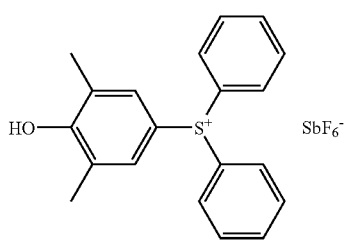
(b-20)

-continued
(b-21)
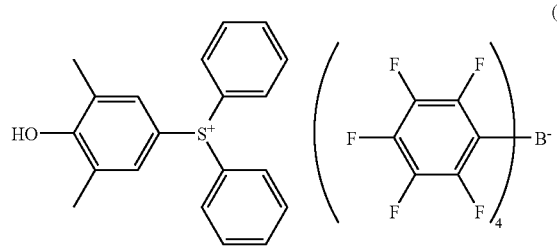
(b-22)
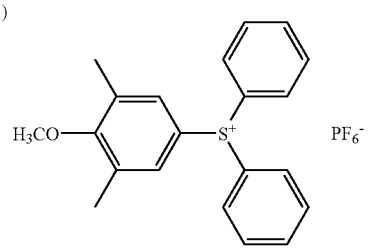
(b-23)
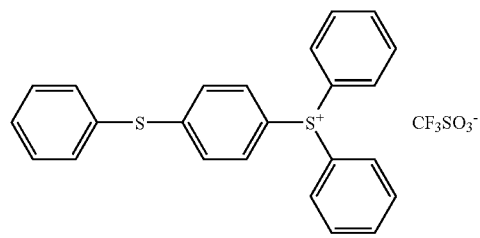
(b-24)
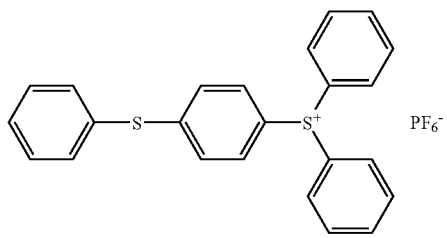
(b-25)
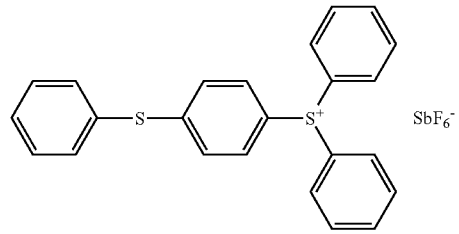
(b-26)
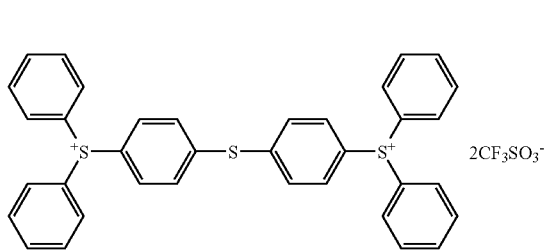
(b-27)
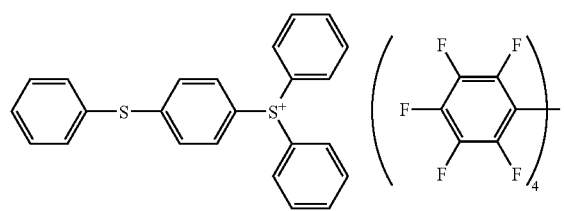
(b-28)
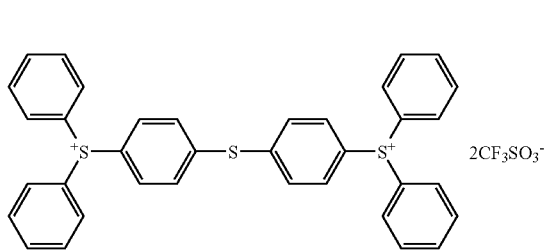
(b-29)
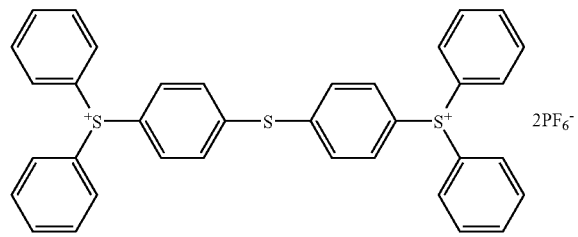
(b-30)
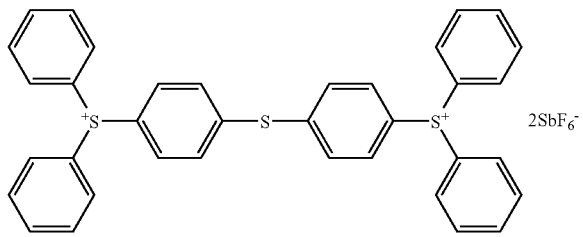
(b-31)
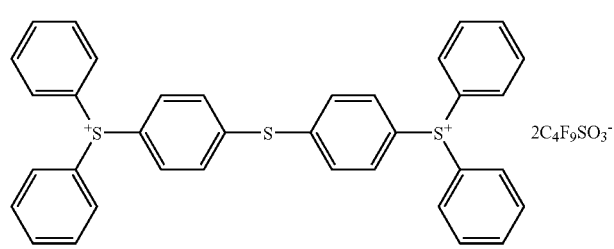

-continued
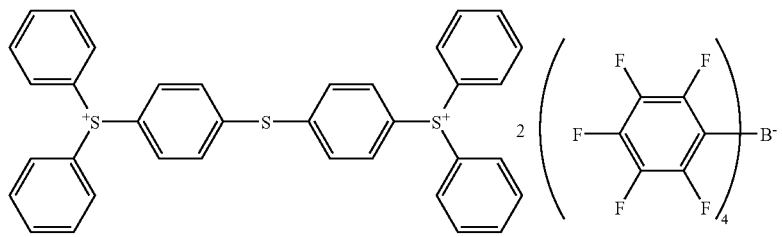
(b-32)
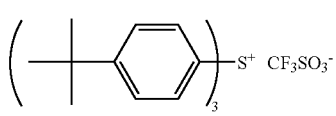
(b-33)
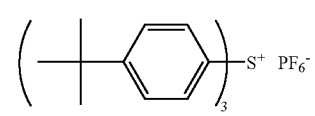
(b-34)
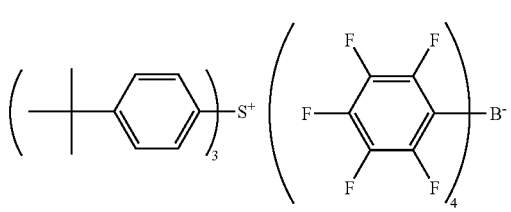
(b-35)
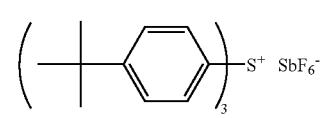
(b-36)
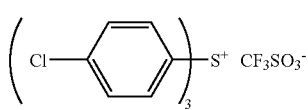
(b-37)
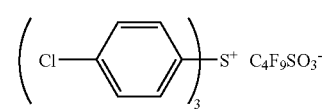
(b-38)
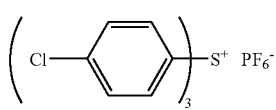
(b-39)
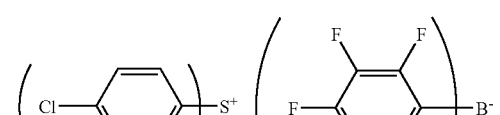
(b-40)
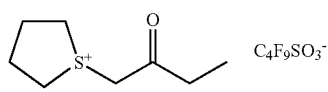
(b-41)
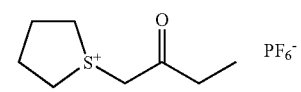
(b-42)
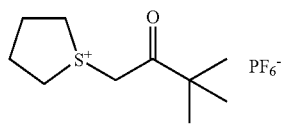
(b-43)
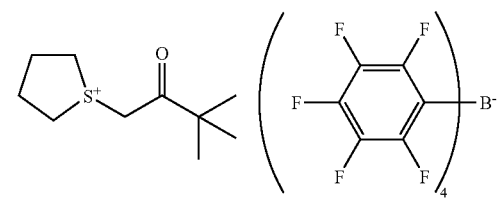
(b-44)
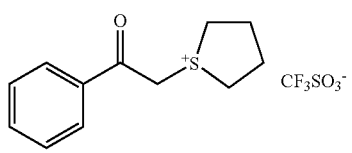
(b-45)
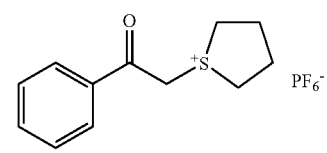
(b-46)
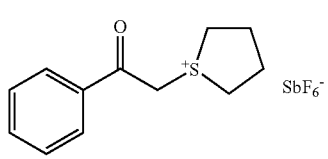
(b-47)
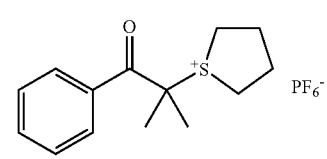
(b-48)

-continued
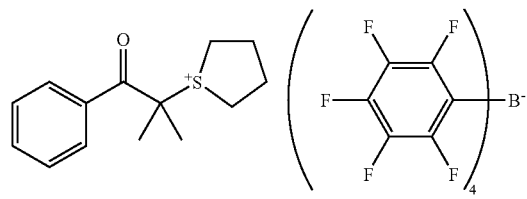 (b-49)
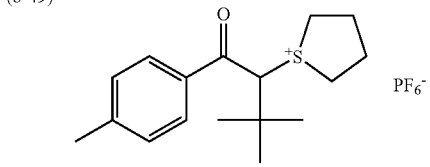 (b-50)
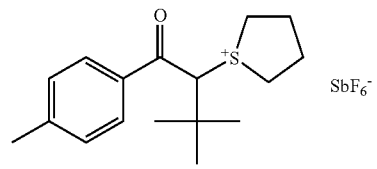 (b-51)
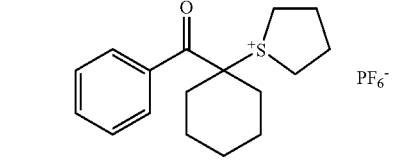 (b-52)
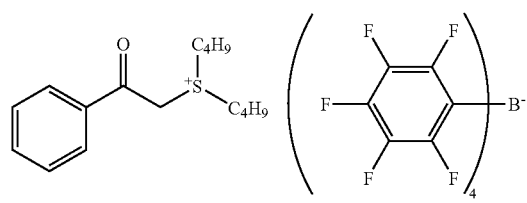 (b-53)
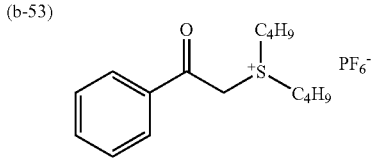 (b-54)
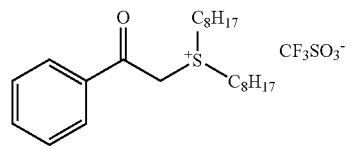 (b-55)
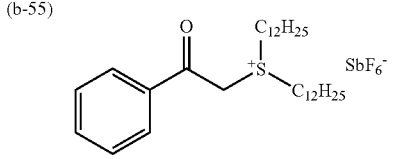 (b-56)
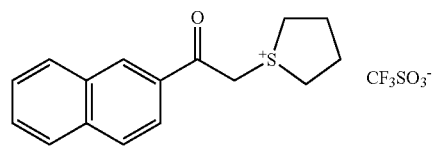 (b-57)
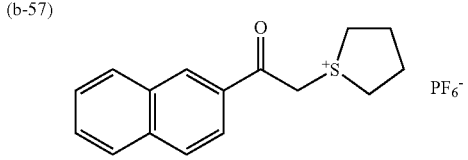 (b-58)
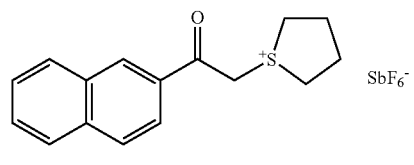 (b-59)
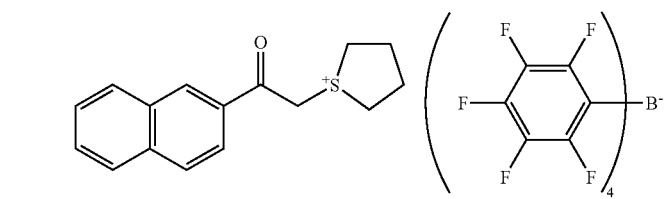 (b-60)
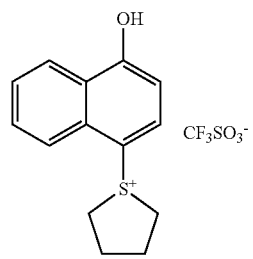 (b-61)
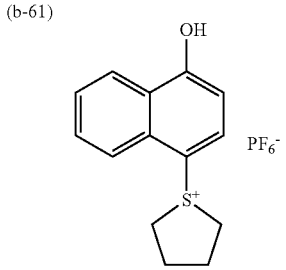 (b-62)

-continued
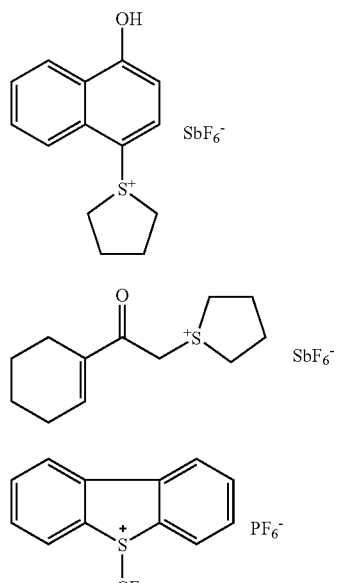
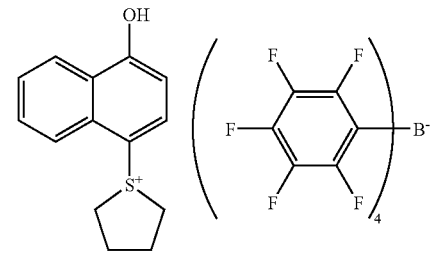
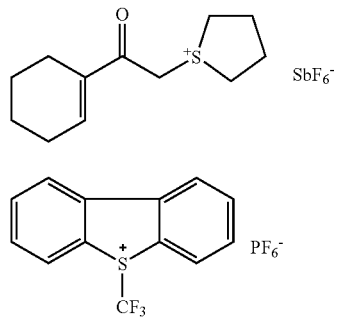
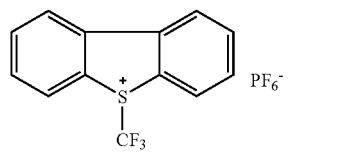
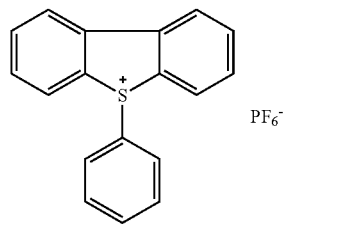
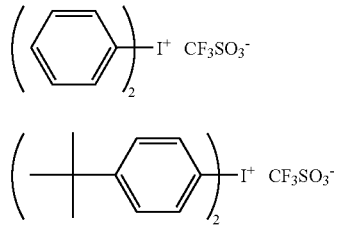
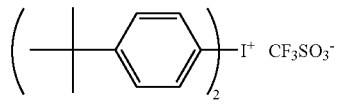
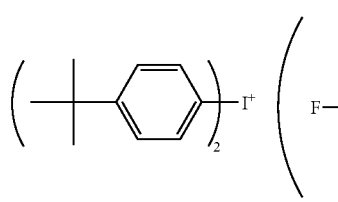
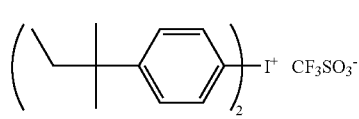
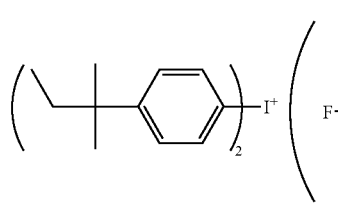

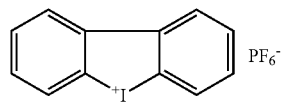
(b-81)
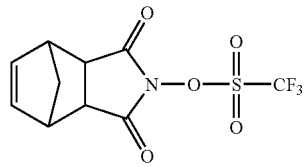
(b-83)
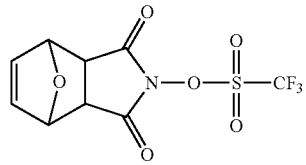
(b-85)
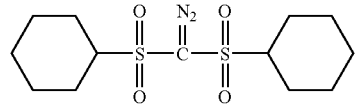
(b-87)
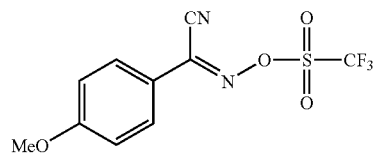
(b-89)
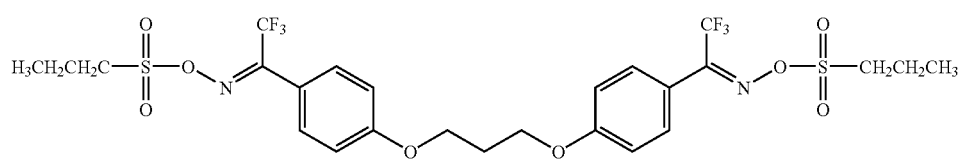
(b-90)
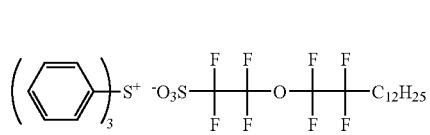
(b-91)
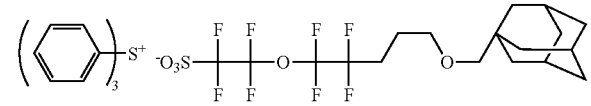
(b-82)
(b-84)
(b-86)
(b-88)
(b-92)
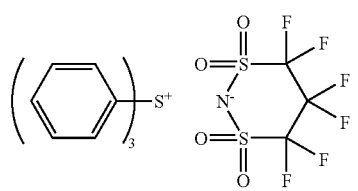
(b-93)
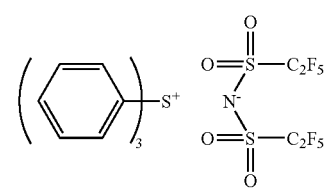
(b-94)
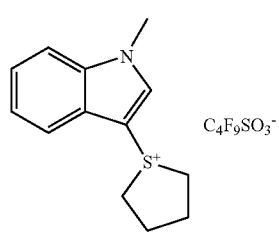
(b-95)
(b-96)

Furthermore, oxazole derivatives and s-triazine derivatives described in Paragraph Nos. (0029) to (0030) of JP-A-2002-122994 may suitably be used.

Onium salt compounds and sulfonate-based compounds cited as examples in Paragraph Nos. (0037) to (0063) of JP-A-2002-122994 may also be suitably used in the present invention.

The photo-acid generator (b) may be used singly or in a combination of two or more types.

The content of the photo-acid generator (b) in the ink composition is preferably 0.1 to 20 wt % on the basis of the total solids content of the ink composition, more preferably 0.5 to 10 wt %, and yet more preferably 1 to 7 wt %.

(C) Coloring Agent

The ink composition of the present invention comprises a coloring agent (c).

The coloring agent that can be used in the present invention is not particularly limited, but a pigment and an oil-soluble dye that have excellent weather resistance and rich color reproduction are preferable, and it may be selected from any known coloring agent such as a soluble dye. It is preferable that the coloring agent that can be suitably used in the ink composition or the inkjet recording ink composition of the present invention does not function as a polymerization inhibitor in a polymerization reaction, which is a curing reaction. This is because the sensitivity of the curing reaction by actinic radiation should not be degraded.

Pigment

The pigment is not particularly limited, and it is possible to use any generally commercially available organic pigment or inorganic pigment, a dispersion of a pigment in an insoluble resin, etc. as a dispersion medium, a pigment on the surface of which a resin has been grafted, etc. It is also possible to use resin particles colored with a dye, etc.

Examples of these pigments include pigments described in 'Ganryo no Jiten' (Dictionary of Pigments) Ed. by Seijirou Ito (2000), W. Herbst, K. Hunger 'Industrial Organic Pigments', JP-A-2002-12607, JP-A-2002-188025, JP-A-2003-26978, and JP-A-2003-342503.

Specific examples of the organic pigment and the inorganic pigment that can be used in the present invention include, as those exhibiting a yellow color, monoazo pigments such as CI Pigment Yellow 1 (Fast Yellow G, etc.) and CI Pigment Yellow 74, disazo pigments such as CI Pigment Yellow 12 (Disazo Yellow AAA, etc.) and CI Pigment Yellow 17, benzidine-free azo pigments such as CI Pigment Yellow 180, azo lake pigments such as CI Pigment Yellow 100 (Tartrazine Yellow Lake, etc.), condensed azo pigments such as CI Pigment Yellow 95 (Azo Condensation Yellow GR, etc.), acidic dye lake pigments such as CI Pigment Yellow 115 (Quinoline Yellow Lake, etc.), basic dye lake pigments such as CI Pigment Yellow 18 (Thioflavine Lake, etc.), anthraquinone pigments such as Flavanthrone Yellow (Y-24), isoindolinone pigments such as Isoindolinone Yellow 3RLT (Y-110), quinophthalone pigments such as Quinophthalone Yellow (Y-138), isoindoline pigments such as Isoindoline Yellow (Y-139), nitroso pigments such as CI Pigment Yellow 153 (Nickel Nitroso Yellow, etc.), and metal complex azomethine pigments such as CI Pigment Yellow 117 (Copper Azomethine Yellow, etc.).

Examples of pigments exhibiting a red or magenta color include monoazo pigments such as CI Pigment Red 3 (Toluidine Red, etc.), disazo pigments such as CI Pigment Red 38 (Pyrazolone Red B, etc.), azo lake pigments such as CI Pigment Red 53:1 (Lake Red C, etc.) and CI Pigment Red 57:1 (Brilliant Carmine 6B), condensed azo pigments such as CI Pigment Red 144 (Azo Condensation Red BR, etc.), acidic dye lake pigments such as CI Pigment Red 174 (Phloxine B Lake, etc.), basic dye lake pigments such as CI Pigment Red 81 (Rhodamine 6G' Lake, etc.), anthraquinone pigments such as CI Pigment Red 177 (Dianthraquinonyl Red, etc.), thioindigo pigments such as CI Pigment Red 88 (Thioindigo Bordeaux, etc.), perinone pigments such as CI Pigment Red 194 (Perinone Red, etc.), perylene pigments such as CI Pigment Red 149 (Perylene Scarlet, etc.), quinacridone pigments such as CI Pigment violet 19 (unsubstituted quinachridone) and CI Pigment Red 122 (Quinacridone Magenta, etc.), isoindolinone pigments such as CI Pigment Red 180 (Isoindolinone Red 2BLT, etc.), and alizarin lake pigments such as CI Pigment Red 83 (Madder Lake, etc.).

Examples of pigments exhibiting a blue or cyan color include disazo pigments such as CI Pigment Blue 25 (Dianisidine Blue, etc.), phthalocyanine pigments such as CI Pigment Blue 15 (Phthalocyanine Blue, etc.) and CI Pigment Blue 15:3, acidic dye lake pigments such as CI Pigment Blue 24 (Peacock Blue Lake, etc.), basic dye lake pigments such as CI Pigment Blue 1 (Victoria Pure Blue BO Lake, etc.), anthraquinone pigments such as CI Pigment Blue 60 (Indanthrone Blue, etc.), and alkali blue pigments such as CI Pigment Blue 18 (Alkali Blue V-5:1).

Examples of pigments exhibiting a green color include phthalocyanine pigments such as CI Pigment Green 7 (Phthalocyanine Green) and CI Pigment Green 36 (Phthalocyanine Green), and azo metal complex pigments such as CI Pigment Green 8 (Nitroso Green).

Examples of pigments exhibiting an orange color include isoindoline pigments such as CI Pigment Orange 66 (Isoindoline Orange) and anthraquinone pigments such as CI Pigment Orange 51 (Dichloropyranthrone Orange).

Examples of pigments exhibiting a black color include Pigment Black 7 (carbon black), titanium black, and aniline black.

Specific examples of white pigments that can be used include basic lead carbonate ($2PbCO_3Pb(OH)_2$, also known as silver white), zinc oxide (ZnO, also known as zinc white), titanium oxide ($TiO_2$, also known as titanium white), and strontium titanate ($SrTiO_3$, also known as titan strontium white).

Titanium oxide has, compared with other white pigments, a low specific gravity, a high refractive index, and is chemically and physically stable, and therefore has high hiding power and coloring power as a pigment and, furthermore, has excellent durability toward acids, alkalis, and other environments. It is therefore preferable to use titanium oxide as the white pigment. It is of course possible to use another white pigment (which can be any white pigment, in addition to the white pigments cited above) as necessary.

For dispersion of the pigment, for example, a dispersing machine such as a ball mill, a sand mill, an attritor, a roll mill, a jet mill, a homogenizer, a paint shaker, a kneader, an agitator, a Henschel mixer, a colloidal mill, an ultrasonic homogenizer, a pearl mill, or a wet type jet mill may be used.

When carrying out dispersion of the pigment, a dispersant may be added. Examples of the dispersant include hydroxyl group-containing carboxylic acid esters, salts of a long-chain polyaminoamide and a high molecular weight acid ester, high molecular weight polycarboxylic acid salts, high molecular weight unsaturated acid esters, high molecular weight copolymers, modified polyacrylates, aliphatic polycarboxylic acids, naphthalenesulfonic acid formaldehyde condensates, polyoxyethylene alkylphosphate esters, and pigment derivatives. It is also preferable to use a commercial polymeric dispersant such as the Solsperse series manufactured by Zeneca.

Furthermore, as a dispersion adjuvant, it is also possible to use a synergist, depending on the various types of pigment. The dispersant and dispersion adjuvant are preferably used at 1 to 50 parts by weight relative to 100 parts by weight of the pigment.

In the ink composition, as a dispersing medium for various components such as the pigment, a solvent may be added, or the cationically polymerizable compound (a), which is a low molecular weight compound, may be used as a dispersing medium without using a solvent, and since the ink composition of the present invention is a radiation curing type ink, and after the ink is applied on top of a recording medium it is cured, it is preferable not to use a solvent. This is because, if a solvent remains in the cured ink image, the solvent resistance is degraded and the VOC (Volatile Organic Compound) problem of the residual solvent occurs. From this viewpoint, it is preferable to use as a dispersing medium the cationically polymerizable compound (a) and, in particular, it is preferable to select a cationically polymerizable monomer having the lowest viscosity in terms of improvement of dispersion suitability and handling properties of the ink composition.

It is preferable for the average particle size of the pigment to be in the range of 0.02 to 0.4 μm, more preferably 0.02 to 0.1 μm, and yet more preferably, 0.02 to 0.07 μm.

In order to make the average particle size of the pigment particles be in the above-mentioned range, the pigment, the dispersant, and the dispersing medium are selected, and dispersion conditions and filtration conditions are set. By such control of particle size, clogging of a head nozzle can be suppressed, and the storage stability of ink, the ink transparency, and the curing sensitivity can be maintained.

Dye

The dye to be used in the present invention is preferably oil-soluble. Specifically, this means that the solubility in water at 25° C. (the weight of a dye that can be dissolved in 100 g of water) is equal to or less than 1 g, preferably equal to or less than 0.5 g, and more preferably equal to or less than 0.1 g. Therefore, the so-called oil-soluble dye, which is insoluble in water, is preferably used.

The dye used in the present invention may preferably be formed by incorporating an oil-solubilizing group into a dye core in order to dissolve a necessary amount thereof in an ink composition.

Examples of the oil-solubilizing group include a long-chain branched alkyl group, a long-chain branched alkoxy group, a long-chain branched alkylthio group, a long-chain branched alkylsulfonyl group, a long-chain branched acyloxy group, a long-chain branched alkoxycarbonyl group, a long-chain branched acyl group, a long-chain branched acylamino group, a long-chain branched alkylsulfonylamino group, a long-chain branched alkylaminosulfonyl group, and an aryl group, aryloxy group, aryloxycarbonyl group, arylcarbonyloxy group, arylaminocarbonyl group, arylaminosulfonyl group, or arylsulfonylamino group containing the long-chain branched substituent above.

Furthermore, a dye may be obtained by converting, using a long-chain branched alcohol, amine, phenol, or aniline derivative, a carboxylic acid or sulfonic acid of a water-soluble dye into an alkoxycarbonyl group, aryloxycarbonyl group, alkylaminosulfonyl group, or arylaminosulfonyl group, which are oil-solubilizing groups.

The above-mentioned oil-soluble dye preferably has a melting point of equal to or less than 200° C., more preferably a melting point of equal to or less than 150° C., and yet more preferably a melting point of equal to or less than 100° C. By using an oil-soluble dye having a low melting point, dye crystallization in the ink composition can be suppressed, and the storage stability of the ink composition is improved.

Furthermore, in order to improve discoloration resistance, in particular, the resistance to an oxidizing material such as ozone, and improve curing properties, it is desirable that the oxidation potential is high. Because of this, as the oil-soluble dye used in the present invention, it is preferable to use those having an oxidation potential of equal to or greater than 1.0 V (vs SCE). The higher the oxidation potential the more preferable it is; those having an oxidation potential of equal to or greater than 1.1 V (vs SCE) are yet more preferable, and those having an oxidation potential of equal to or greater than 1.15V (vs SCE) or greater are particularly preferable.

As a yellow dye, a compound having a structure represented by Formula (Y-I) described in JP-A-2004-250483 is preferable.

Dyes represented by Formulae (Y-II) to (Y-IV) described in paragraph No. (0034) of JP-A-2004-250483 are particularly preferable, and specific examples thereof include compounds described in paragraph Nos. (0060) to (0071) of JP-A-2004-250483. The oil-soluble dye represented by Formula (Y-I) described in this publication may be used not only for a yellow ink but also for any color ink, including a black ink and a red ink.

As a magenta dye, a compound having a structure represented by Formulae (3) and (4) described in JP-A-2002-114930 is preferable, and specific examples thereof include compounds described in paragraph Nos. (0054) to (0073) of JP-A-2002-114930.

Particularly preferred dyes are azo dyes represented by Formulae (M-1) to (M-2) described in paragraph Nos. (0084) to (0122) of JP-A-2002-121414, and specific examples thereof include compounds described in paragraph Nos. (0123) to (0132) of JP-A-2002-121414. The oil-soluble dyes represented by Formulae (3), (4), and (M-1) to (M-2) described in this publication may be used not only for a magenta ink but also for any color ink, including a black ink and a red ink.

Preferred examples of a cyan dye include dyes represented by Formulae (I) to (IV) described in JP-A-2001-181547 and dyes represented by Formulae (IV-1) to (IV-4) described in paragraph Nos. (0063) to (0078) of JP-A-2002-121414, and specific examples thereof include compounds described in paragraph Nos. (0052) to (0066) of JP-A-2001-181547, and paragraph Nos. (0079) to (0081) of JP-A-2002-121414.

Particularly preferred dyes are phthalocyanine dyes represented by Formulae (C-I) and (C-II) described in paragraph Nos. (0133) to (0196) of JP-A-2002-121414, and a phthalocyanine dye represented by Formula (C-II) is more preferable. Specific examples thereof include compounds described in paragraph Nos. (0198) to (0201) of JP-A-2002-121414. The oil-soluble dyes represented by the above-mentioned Formulae (I) to (IV), (IV-1) to (IV-4), (C-I), and (C-II) may be used not only for a cyan ink but also for any color ink, including a black ink and a green ink.

—Oxidation Potential—

The oxidation potential value (Eox) of a dye used in the present invention can be easily measured by one skilled in the art and the method therefor is described in, for example, P. Delahay, 'New Instrumental Methods in Electrochemistry', Interscience Publishers (1954), A. J. Bard et al., 'Electrochemical Methods', John Wiley & Sons (1980), and Akira Fujishima et al., 'Denkikagaku Sokuteihou' (Electrochemical Measurement Methods), Gihodo Shuppan Sha (1984).

More specifically, a test sample is dissolved to give a concentration of $1\times10^{-2}$ to $1\times10^{-6}$ mol/L in a solvent such as dimethylformamide or acetonitrile containing a supporting electrolyte such as sodium perchlorate or tetrapropylammonium perchlorate, an oxidation wave when sweeping toward the oxidation side (noble side) using carbon (GC) as a working electrode and a rotating platinum electrode as the counter electrode using cyclic voltammetry or direct current polarographic equipment is approximated to a straight line, and the oxidation potential of the midpoint of a line segment formed between an intersection point of the straight line and a residual current/potential straight line and an intersection point of the straight line and a saturated current straight line (or an intersection point with a straight line parallel to the ordinate passing through the potential peak value) is measured as a value relative to the SCE (saturated calomel electrode). This value sometimes deviates by on the order of tens of millivolts due to the effect of a liquid junction potential, the liquid resistance of the sample solution, or the like, but the reproducibility of the potential can be guaranteed by adding a standard sample (for example, hydroquinone). The support electrolyte and solvent used may be selected appropriately according to the oxidation potential and the solubility of the test sample. The support electrolyte and solvent that can be used here may be referred to in Akira Fujishima et al., 'Denkikagaku Sokuteihou' (Electrochemical Measurement Methods), Gihodo Shuppan Sha (1984), pp. 101 to 118.

Specific examples of the dye that can be used in the present invention are illustrated below, but the dyes used in the present invention are not limited to the specific examples below.

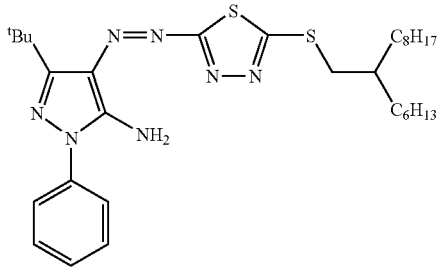

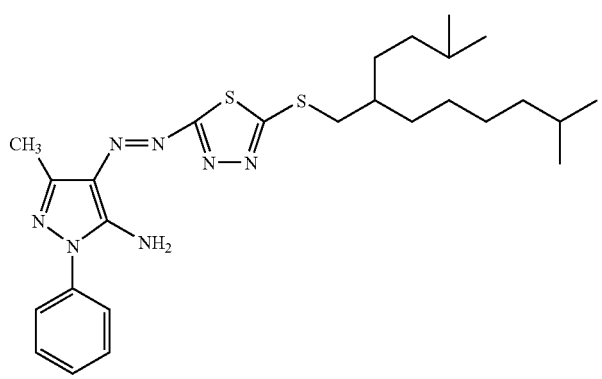

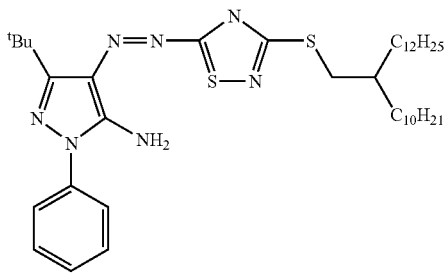

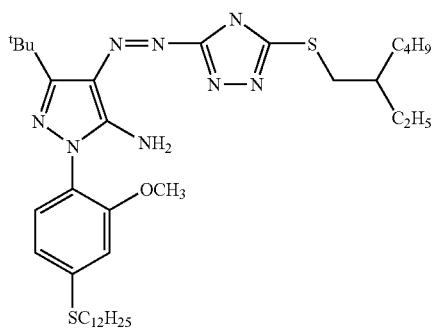

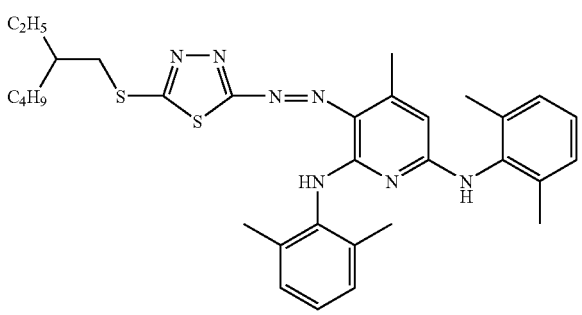

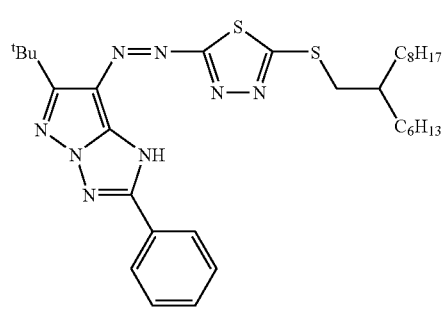

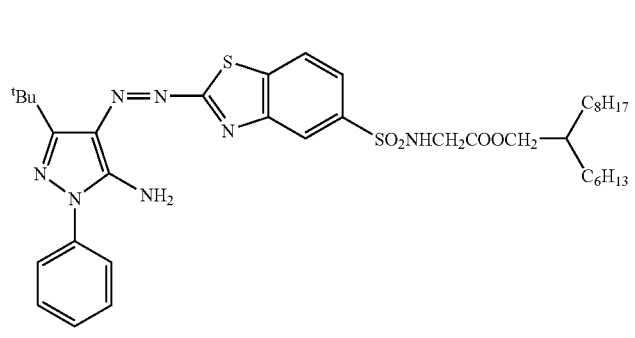
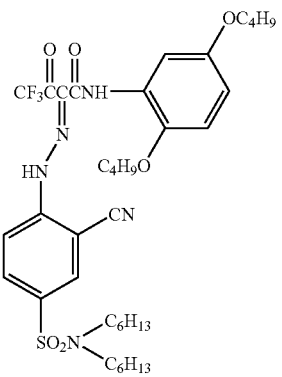
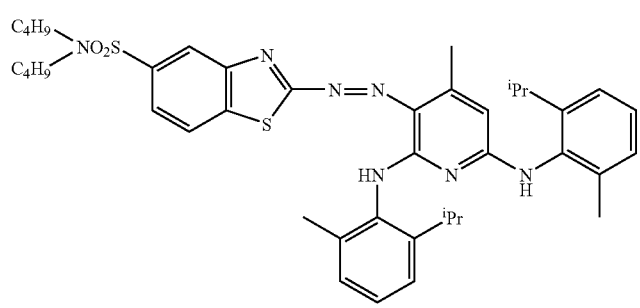
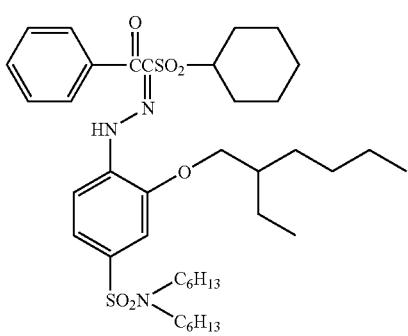
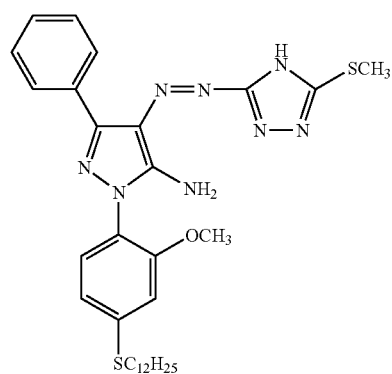
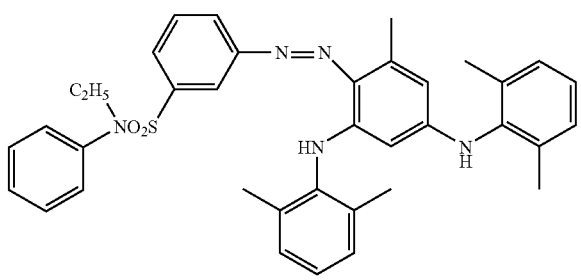
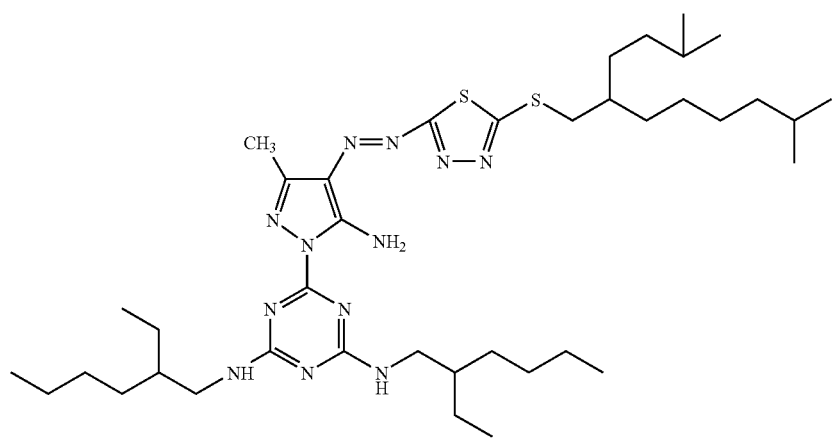

-continued
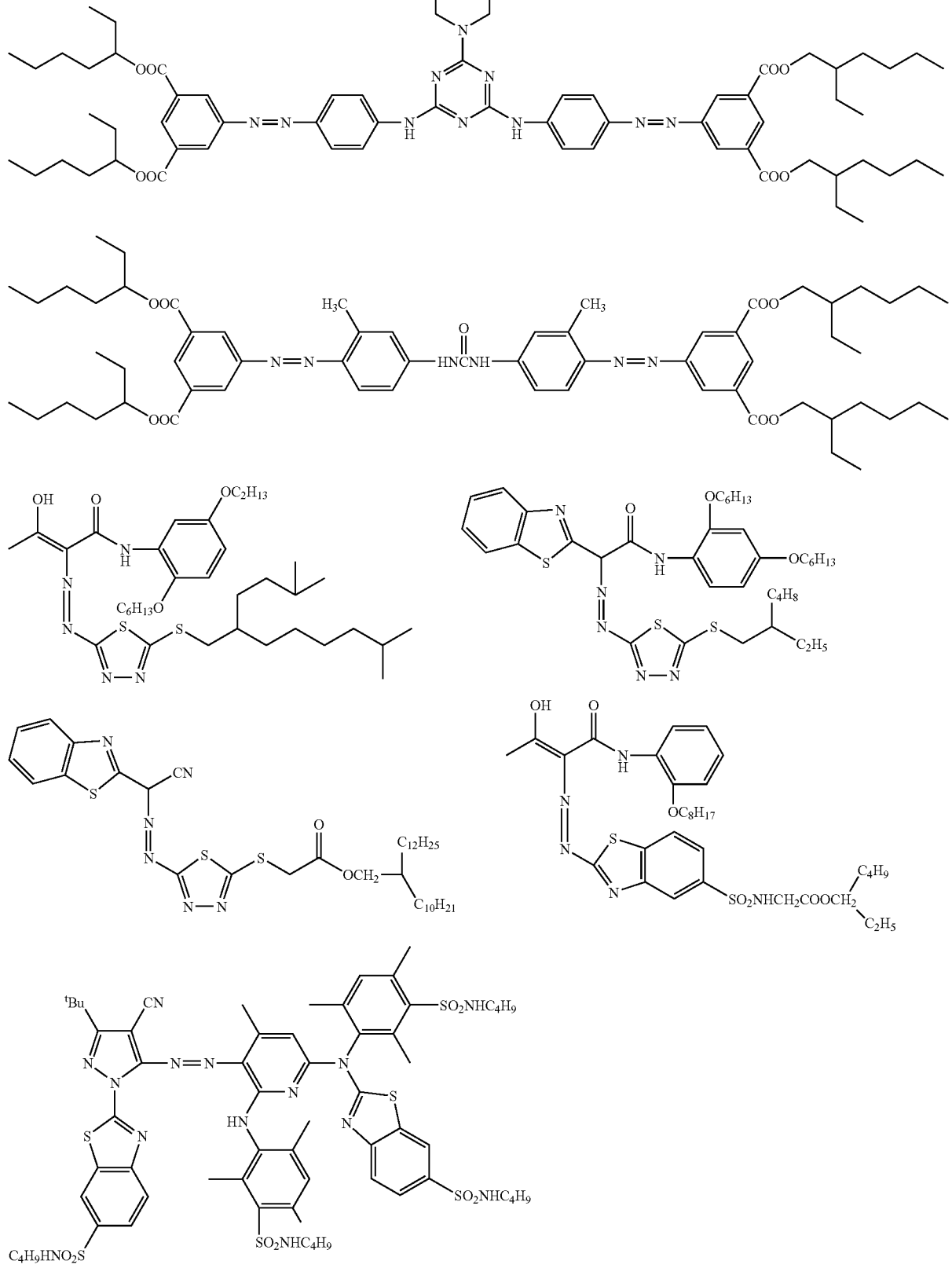

-continued
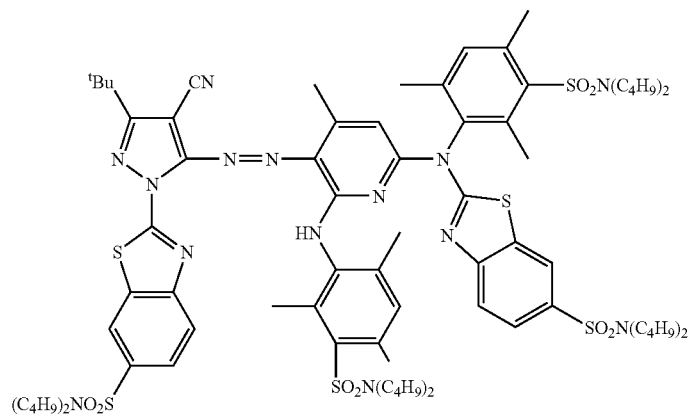
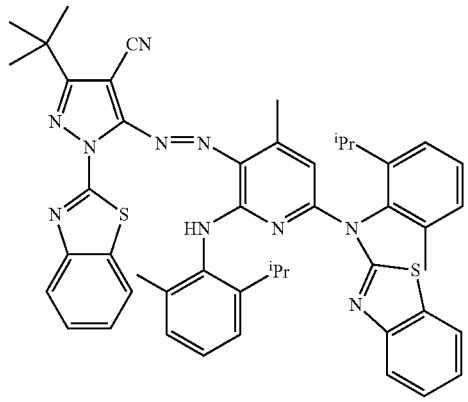
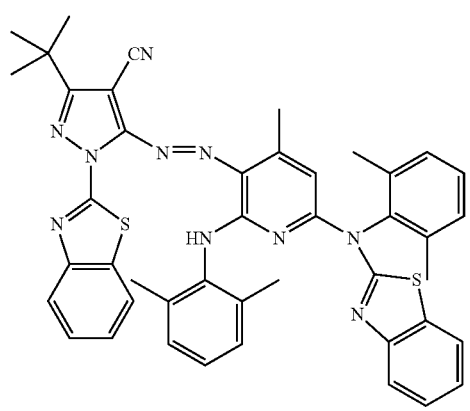
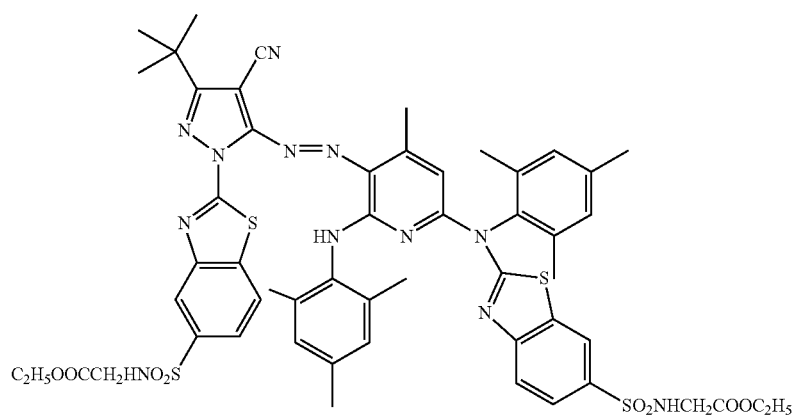
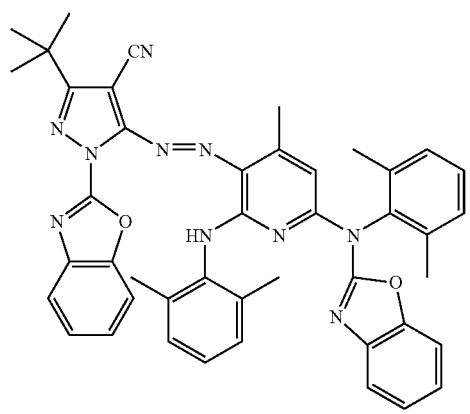
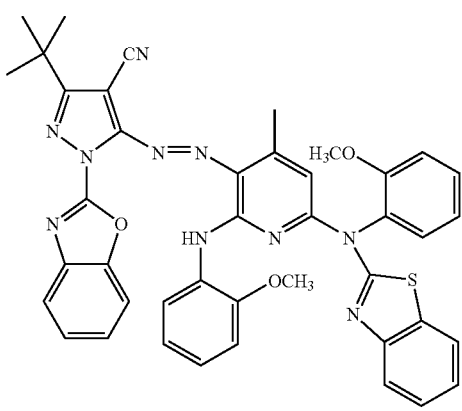

47 48
-continued
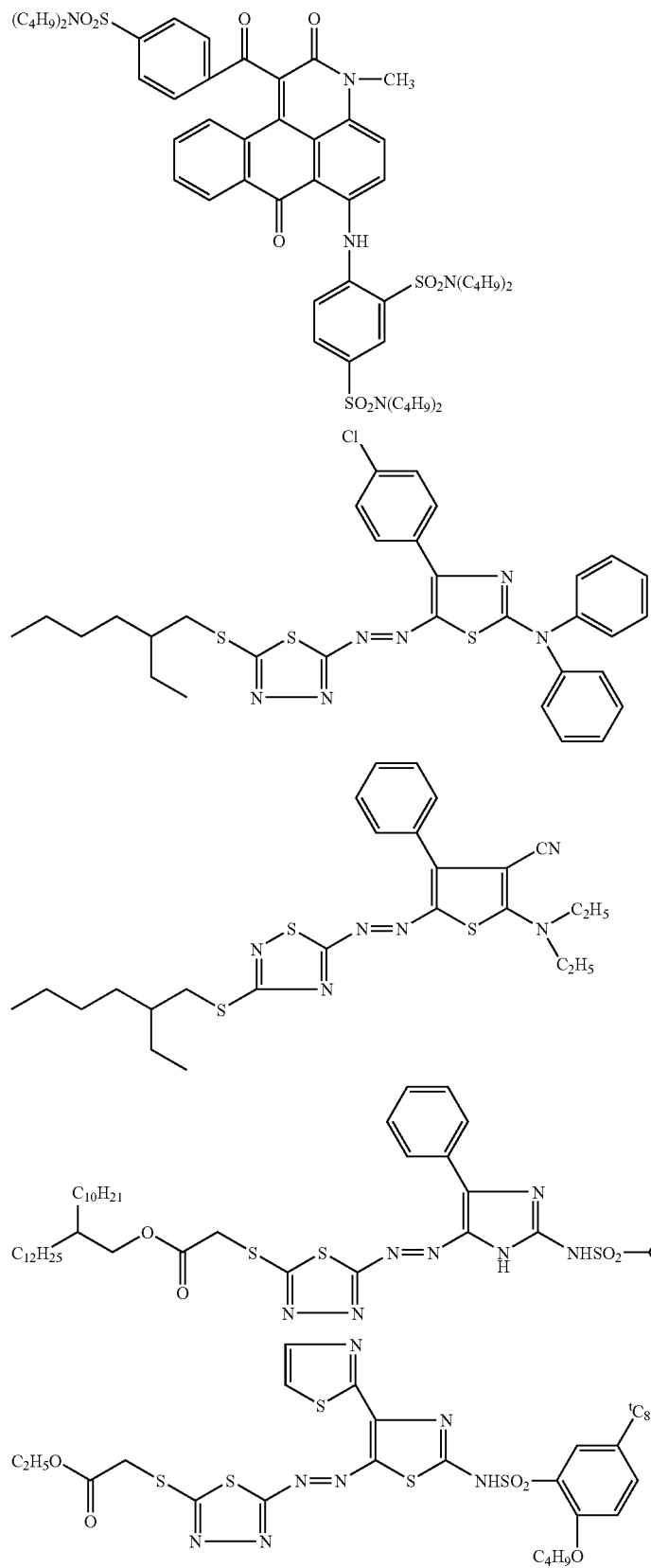

-continued
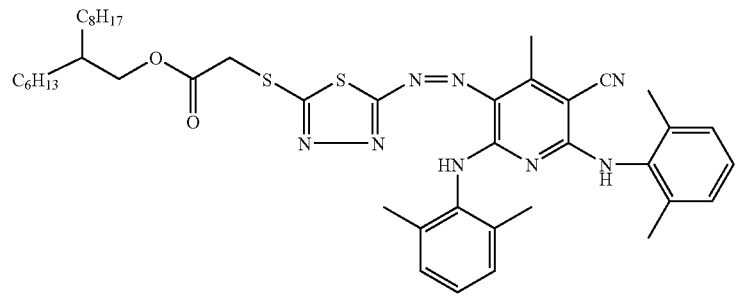
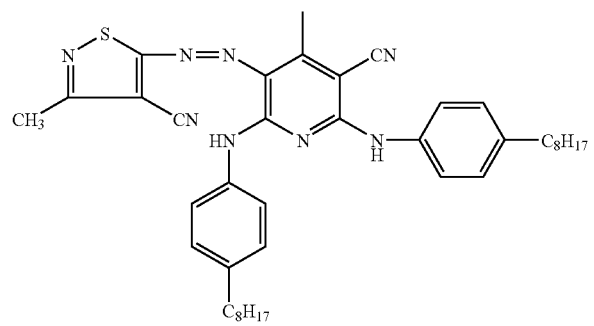
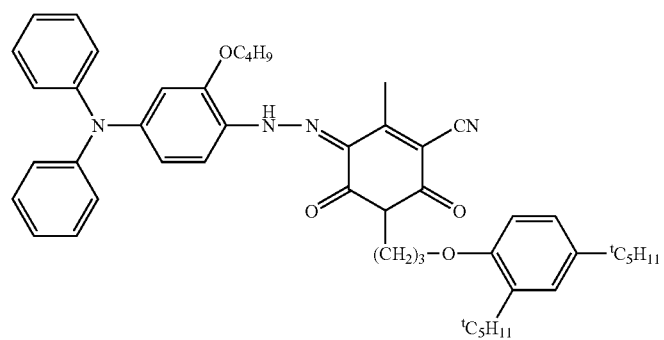
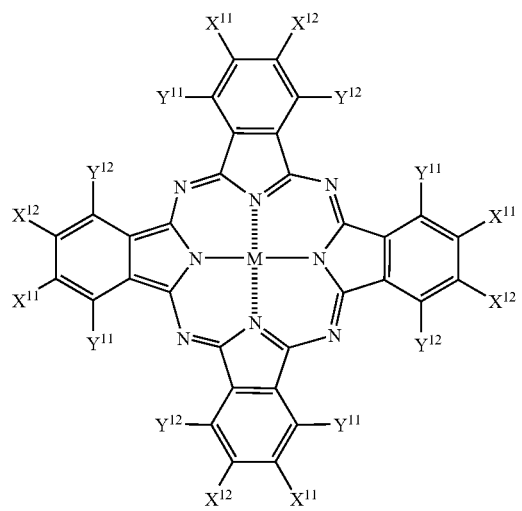

In the formula, the order of the groups ($X^{11}$, $X^{12}$) and of the groups ($Y^{11}$, $Y^{12}$) is not important.

| No. | M | $X^{11}$ | $X^{12}$ | $Y^{11}, Y^{12}$ |
|---|---|---|---|---|
| e-1 | Cu | ~O₂S-CH₂CH₂CH₂-SO₂-NH-CH₂-C(=O)-O-CH₂-C(=O)-OEt | H | H, H |
| e-2 | Cu | ~O₂S-CH₂CH₂CH₂-SO₂-NH-CH₂-C(=O)-O-CH(CH₃)-C(=O)-OEt | H | H, H |
| e-3 | Cu | ~O₂S-CH₂CH₂CH₂-SO₂-NH-CH₂-C(=O)-O-CH(C₄H₉)-C(=O)-OMe | H | H, H |
| e-4 | Cu | ~O₂S-CH₂CH₂CH₂-SO₂-NH-CH(CH₃)-C(=O)-O-CH(C₄H₉)-C(=O)-OEt | H | H, H |
| e-5 | Cu | ~O₂S-CH₂CH₂CH₂-SO₂-NH-CH(CH₃)-C(=O)-O-CH₂-C(=O)-OEt | H | H, H |
| e-6 | Cu | ~O₂S-CH₂CH₂CH₂-SO₂-NH-CH₂CH₂-C(=O)-O-CH₂-C(=O)-OEt | H | H, H |
| e-7 | Cu | ~O₂S-CH₂CH₂CH₂-SO₂-NH-CH₂CH₂-C(=O)-O-CH₂CH₂-C(=O)-OEt | H | H, H |
| e-8 | Cu | ~O₂S-CH₂CH₂CH₂-SO₂-N(Me)-C(=O)-O-CH₂-C(=O)-OMe | H | H, H |

-continued
| No. | M | $X^{11}$ | $X^{12}$ | $Y^{11}, Y^{12}$ |
|---|---|---|---|---|
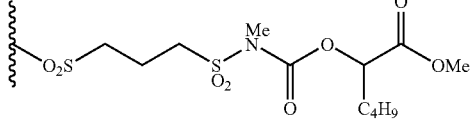
In the formula, the order of the groups ($X^{11}$, $X^{12}$) and of the groups ($Y^{11}$, $Y^{12}$) is not important.
| No. | M | $X^{11}$ | $X^{12}$ | $Y^{11}, Y^{12}$ |
|---|---|---|---|---|
| e-9 | Cu | 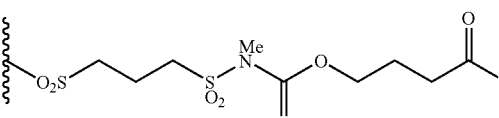 | H | H, H |
| e-10 | Cu | 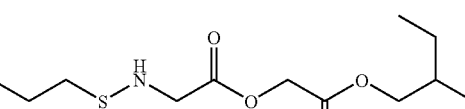 | H | H, H |
| e-11 | Cu | 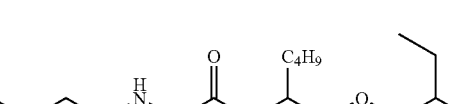 | H | H, H |
| e-12 | Cu | 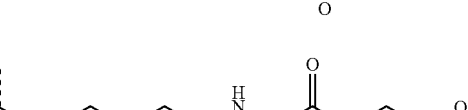 | H | H, H |
| e-13 | Cu |  | H | H, H |

-continued

| No. | M | $X^{11}$ | $X^{12}$ | $Y^{11}, Y^{12}$ |
|---|---|---|---|---|
| e-14 | Cu | (structure: ~O₂S-CH₂CH₂-S(O₂)-NH-CH(iPr)-C(O)O-CH(CH₃)-C(O)-OEt) | H | H, H |
| e-15 | Cu | (structure: ~O₂S-CH₂-C(O)O-CH₂-C(O)O-CH₂CH(Et)(n-Bu)) | H | H, H |
| e-16 | Cu | (structure: ~O₂S-CH₂-C(O)O-CH₂-C(O)O-Et) | H | H, H |

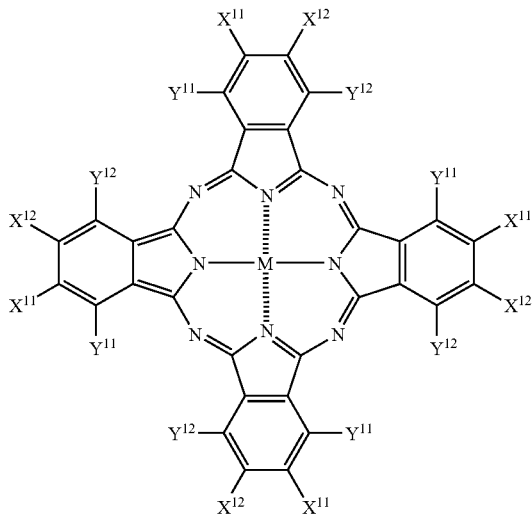

In the formula, the order of the groups ($X^{11}$, $X^{12}$) and of the groups ($Y^{11}$, $Y^{12}$) is not important.

| No. | M | $X^{11}$ | $X^{12}$ | $Y^{11}, Y^{12}$ |
|---|---|---|---|---|
| e-17 | Cu | (structure: ~O₂S-CH₂-C(O)O-CH₂CH₂CH₂-C(O)O-Et) | H | H, H |
| e-18 | Cu | (structure: ~O₂S-CH₂CH₂CH₂-C(O)O-CH₂-C(O)O-CH₂CH(Et)(n-Bu)) | H | H, H |

-continued
| No. | M | X¹¹ | X¹² | Y¹¹, Y¹² |
|---|---|---|---|---|
| e-19 | Cu | 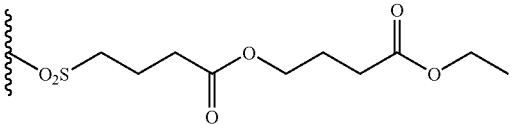 | H | H, H |
| e-20 | Cu | 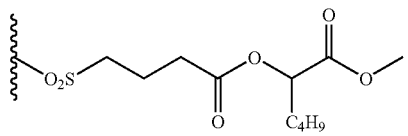 | H | H, H |
| e-21 | Cu | 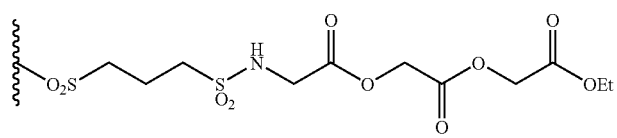 | H | H, H |
| e-22 | Cu | 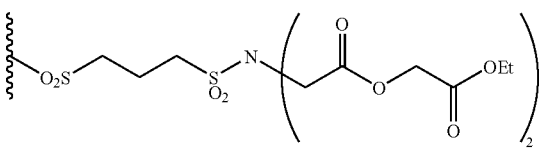 | H | H, H |
| e-23 | Cu | 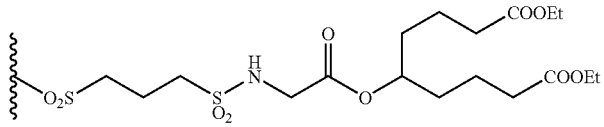 | H | H, H |
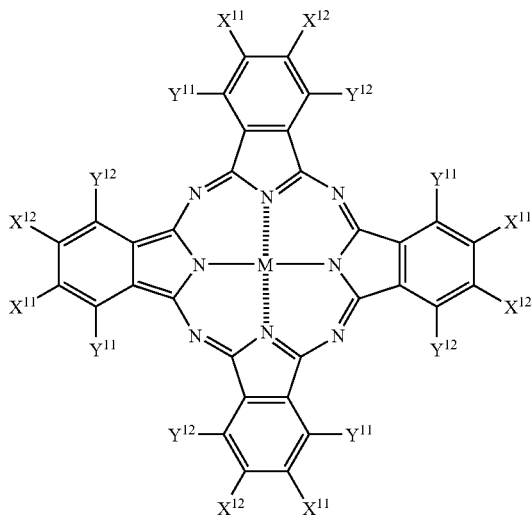

In the formula, the order of the groups ($X^{11}$, $X^{12}$) and of the groups ($Y^{11}$, $Y^{12}$) is not important.

| No. | M | $X^{11}$ | $X^{12}$ | $Y^{11}, Y^{12}$ |
|---|---|---|---|---|
| e-24 | Cu | ~O₂S–(CH₂)₃–SO₂–NH–CH₂–CH(OC(O)Et)–CH₂–OC(O)Et | H | H, H |
| e-25 | Cu | ~O₂S–(CH₂)₃–SO₂–NH–CH(CH₃)–C(O)–O–CH₂–C(O)–OEt | H | H, Cl |
| e-26 | Cu | ~O₂S–(CH₂)₃–SO₂–NH–CH₂CH₂–C(O)–O–CH₂–C(O)–OEt | H | H, Cl |
| e-27 | Cu | ~O₂S–(CH₂)₃–SO₂–NH–CH₂CH₂–C(O)–O–(CH₂)₃–C(O)–OEt | H | H, Cl |
| e-28 | Cu | ~O₂S–(CH₂)₃–SO₂–N(Me)–C(O)–O–CH₂–C(O)–OEt | H | H, Cl |
| e-29 | Cu | ~O₂S–(CH₂)₃–SO₂–N(Me)–C(O)–O–CH(C₄H₉)–C(O)–OEt | H | H, Cl |
| e-30 | Cu | ~O₂S–(CH₂)₃–SO₂–N(Me)–C(O)–O–(CH₂)₃–C(O)–OEt | H | H, Cl |

-continued
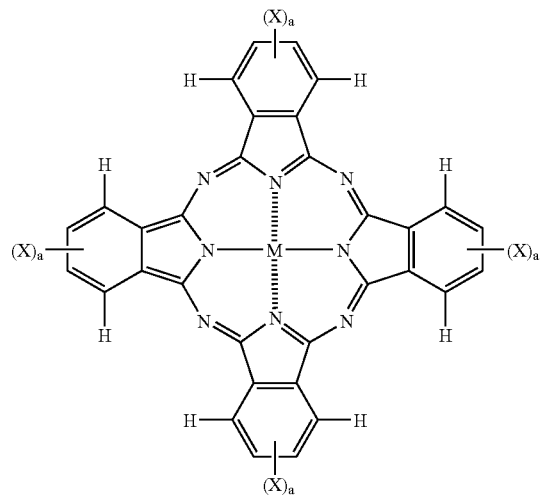
| No. | M | X | a |
|---|---|---|---|
| e-31 | Cu | —SO₂—C₆H₄—NHCO—C₆H₄—SO₃K (3,3') | 1 |
| e-32 | Cu | —SO₂—C₆H₄—SO₂NH—C₆H₄—SO₃Na (3,3') | 1 |
| e-33 | Cu | —SO₂—C₆H₄—CO₂K (3) | 1 |
| e-34 | Ni | —SO₂—C₆H₄—CONH—C₆H₄—CO₂K (3,3') | 1 |
| e-35 | Cu | —SO₂-(2-imidazolyl)-N-(CH₂)₄SO₃K | 1 |
| e-36 | Cu | —SO₂-(2-benzimidazolyl)-N-(CH₂)₃SO₃K | 1 |

-continued
| | | | |
|---|---|---|---|
| e-37 | Cu | 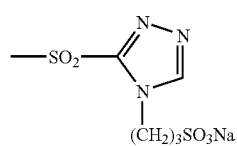 | 1 |
| e-38 | Cu | 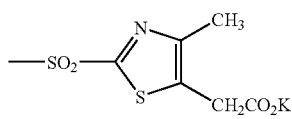 | 1 |
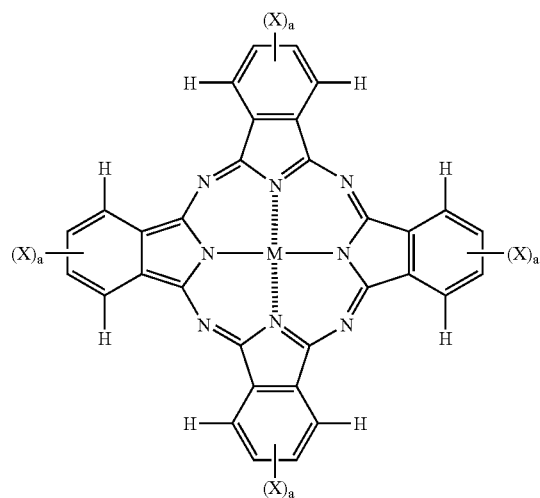
| No. | M | X | a |
|---|---|---|---|
| e-39 | Cu | 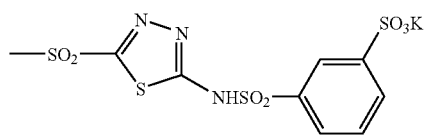 | 1 |
| e-40 | Cu | 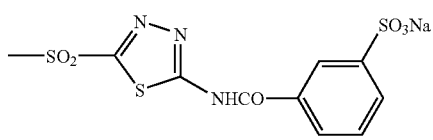 | 1 |
| e-41 | Cu | 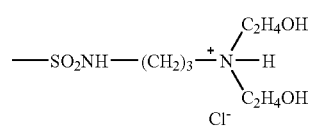 | 1 |
| e-42 | Cu | 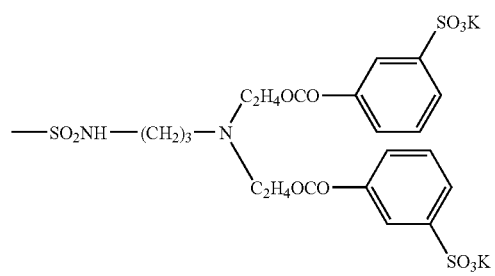 | 1 |

-continued

| No. | M | (structure) | a |
|---|---|---|---|
| e-43 | Cu | —SO$_2$NH—(CH$_2$)$_3$—N$^+$(CH$_3$)(C$_2$H$_4$OH)(C$_2$H$_4$OH)  · CH$_3$-C$_6$H$_4$-SO$_3^-$ | 1 |
| e-44 | Cu | —SO$_2$NH—C$_6$H$_4$—NHCO—C$_6$H$_4$—SO$_3$K | 1 |
| e-45 | Cu | —SO$_2$NH—(CH$_2$)$_3$—N(C$_4$H$_8$SO$_3$K)(C$_4$H$_8$SO$_3$K) | 1 |
| e-46 | Ni | —SO$_2$NH—(CH$_2$)$_3$—N(C$_4$H$_8$SO$_3$K)(C$_4$H$_8$SO$_3$K) | 1 |

(metal phthalocyanine structure with (X)$_a$ substituents on four benzene rings and central metal M)

| No. | M | X | a |
|---|---|---|---|
| e-47 | Zn | —SO$_2$NH—(CH$_2$)$_3$—N(C$_4$H$_8$SO$_3$K)(C$_4$H$_8$SO$_3$K) | 1 |
| e-48 | Cu | —SO$_2$NH—(CH$_2$)$_3$—N(C$_2$H$_4$OH)(C$_4$H$_8$SO$_3$K) | 1 |
| e-49 | Cu | —SO$_2$NH—(CH$_2$)$_3$—N(C$_2$H$_4$OCH$_3$)(C$_4$H$_8$SO$_3$K) | 1 |
| e-50 | Cu | —SO$_2$NH—(CH$_2$)$_3$—O—C$_6$H$_4$—SO$_3$K | 1 |

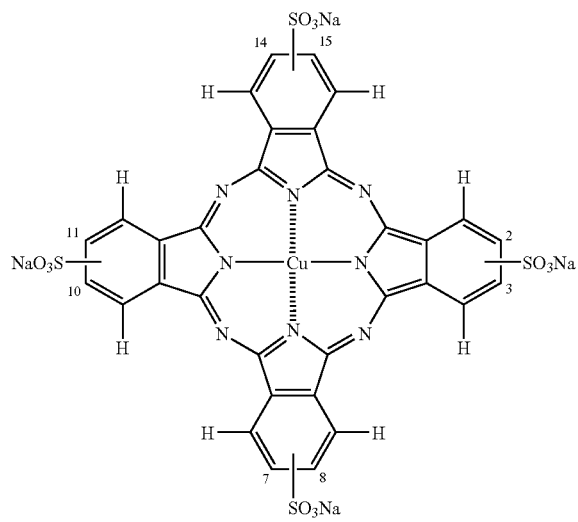

It is preferable to add these colorant at 1 to 20 wt % on a solids content basis of the ink composition, and more preferably 2 to 10 wt %.

Other Components

Various types of additives that are used as necessary are described below.

UV Absorber

In the present invention, a UV absorber may be used from the viewpoint of improving the weather resistance of an image obtained and preventing discoloration.

The UV absorbers include benzotriazole compounds described in JP-A-58-185677, JP-A-61-190537, JP-A-2-782, JP-A-5-197075 and JP-A-9-34057; benzophenone compounds described in JP-A-46-2784, JP-A-5-194483 and U.S. Pat. No. 3,214,463; cinnamic acid compounds described in JP-B-48-30492, JP-B-56-21141 and JP-A-10-88106; triazine compounds described in JP-A-4-298503, JP-A-8-53427, JP-A-8-239368, JP-A-10-182621 and JP-W-8-501291 (the term "JP-W" as used herein means an unexamined published international patent application); compounds described in Research Disclosure No. 24239; and compounds represented by stilbene and benzoxazole compounds, which absorb ultraviolet rays to emit fluorescence, the so-called fluorescent brightening agents.

The amount thereof added is appropriately selected according to the intended application, and it is generally on the order of 0.5 to 15 wt % on the basis of the solids content in the ink composition.

Sensitizer The ink composition of the present invention may contain a sensitizer as necessary for the purpose of improving the acid generating efficiency of the photo-acid generator and increasing the photosensitive wavelength. Any sensitizer may be used as long as the photo-acid generator is sensitized by virtue of an electron transfer mechanism or an energy transfer mechanism. Preferred examples thereof include aromatic polycondensed compounds such as anthracene, 9,10-dialkoxyanthracene, pyrene, and perylene, aromatic ketone compounds such as acetophenone, benzophenone, thioxanthone, and Michler's ketone, and heterocyclic compounds such as phenothiazine and N-aryloxazolidinone. The amount thereof added is appropriately selected according to the intended application, and it is generally used at 0.01 to 1 mol % relative to the photo-acid generator (b), and preferably 0.1 to 0.5 mol %.

Antioxidant

In order to improve the stability of the ink composition, an antioxidant may be added. Examples of the antioxidant include those described in Laid-open European Patent Nos. 223739, 309401, 309402, 310551, 310552, and 459416, Laid-open German Patent No. 3435443, JP-A-54-48535, JP-A-62-262047, JP-A-63-113536, JP-A-63-163351, JP-A-2-262654, JP-A-2-71262, JP-A-3-121449, JP-A-5-61166, JP-A-5-119449, and U.S. Pat. Nos. 4,814,262 and 4,980,275.

The amount thereof added is appropriately selected according to the intended application, and it is preferably on the order of 0.1 to 8 wt % on the basis of the solids content in the ink composition.

Antifading Agent

The ink composition of the present invention may employ various organic and metal complex antifading agents. The organic antifading agents include hydroquinones, alkoxyphenols, dialkoxyphenols, phenols, anilines, amines, indanes, chromans, alkoxyanilines, and heterocycles, and the metal complex antifading agents include nickel complexes and zinc complexes. More specifically, there can be used compounds described in patents cited in Research Disclosure, No. 17643, Items VII-I to J, ibid., No. 15162, ibid., No. 18716, page 650, left-hand column, ibid., No. 36544, page 527, ibid., No. 307105, page 872, and ibid., No. 15162, and compounds contained in general formulae and compound examples of typical compounds described in JP-A-62-215272, pages 127 to 137.

The amount thereof added is appropriately selected according to the intended application, and it is preferably on the order of 0.1 to 8 wt % on the basis of the solids content in the ink composition.

Conductive Salt

The ink composition of the present invention may contain, for the purpose of controlling discharge properties, a conductive salt such as potassium thiocyanate, lithium nitrate, ammonium thiocyanate, or dimethylamine hydrochloride.

Solvent

It is also effective to add a trace amount of organic solvent to the ink composition of the present invention in order to improve the adhesion to a recording medium.

Examples of the solvent include ketone-based solvents such as acetone, methyl ethyl ketone, and diethyl ketone, alcohol-based solvents such as methanol, ethanol, 2-propanol, 1-propanol, 1-butanol, and tert-butanol, chlorine-based solvents such as chloroform and methylene chloride, aromatic-based solvents such as benzene and toluene, ester-based solvents such as ethyl acetate, butyl acetate, and isopropyl acetate, ether-based solvents such as diethyl ether, tetrahydrofuran, and dioxane, and glycol ether-based solvents such as ethylene glycol monomethyl ether and ethylene glycol dimethyl ether.

In this case, it is effective if the amount thereof added is in a range that does not cause problems with the solvent resistance or the VOC, and the amount is preferably in the range of 0.1 to 5 wt % relative to the total amount of the ink composition, and more preferably 0.1 to 3 wt %.

High Molecular Weight Compound

The ink composition may contain various types of high molecular weight compounds in order to adjust film physical properties. Examples of the high molecular weight compounds include acrylic polymers, polyvinylbutyral resins, polyurethane resins, polyamide resins, polyester resins, epoxy resins, phenol resins, polycarbonate resins, polyvinylformal resins, shellac, vinylic resins, acrylic resins, rubber-based resins, waxes, and other natural resins. They may be used in a combination of two or more types. Among these, a vinylic copolymer obtained by copolymerization of an acrylic monomer is preferable. Furthermore, as a copolymer component of the high molecular weight compound, a copolymer containing as a structural unit a 'carboxyl group-containing monomer', an 'alkyl methacrylate ester', or an 'alkyl acrylate ester' may preferably be used.

Surfactant

The ink composition of the present invention may contain a surfactant.

As the surfactant, those described in JP-A-62-173463 and JP-A-62-183457 can be cited. Examples thereof include anionic surfactants such as dialkylsulfosuccinic acid salts, alkylnaphthalenesulfonic acid salts, and fatty acid salts, nonionic surfactants such as polyoxyethylene alkyl ethers, polyoxyethylene alkyl allyl ethers, acetylene glycols, and polyoxyethylene/polyoxypropylene block copolymers, and cationic surfactants such as alkylamine salts and quaternary ammonium salts. Instead of the surfactant, an organofluoro compound may be used. The organofluoro compound is preferably hydrophobic. Examples of the organofluoro compound include fluorine-based surfactants, oil-like fluorine-based compounds (e.g. a fluorine oil), and solid fluorine compounds resin (e.g. tetrafluoroethylene resin), and those described in JP-B-57-9053 (8th to 17th columns) and JP-A-62-135826.

In addition to the above, the composition may contain as necessary, for example, a leveling additive, a matting agent, a wax for adjusting film physical properties, or a tackifier in order to improve the adhesion to a recording medium such as polyolefin or PET, the tackifier not inhibiting polymerization.

Specific examples of the tackifier include high molecular weight tacky polymers described on pp. 5 and 6 of JP-A-2001-49200 (e.g. a copolymer formed from an ester of (meth) acrylic acid and an alcohol having an alkyl group with 1 to 20 carbons, an ester of (meth)acrylic acid and an alicyclic alcohol having 3 to 14 carbons, or an ester of (meth)acrylic acid and an aromatic alcohol having 6 to 14 carbons), and a low molecular weight tackifying resin having a polymerizable unsaturated bond.

Preferable Physical Properties of Ink Composition

While taking into consideration dischargability, the viscosity of the ink composition of the present inbension at the discharge temperature (e.g. 25° C. to 80° C., and preferably 25° C. to 50° C.) is preferably 5 to 30 mPa·s, and more preferably 7 to 15 mPa·s. For example, the ink composition of the present invention has a viscosity at room temperature (25° C. to 30° C.) of preferably 8 to 300 mPa·s, and more preferably 10 to 100 mPa·s. With regard to the ink composition of the present invention, it is preferable that its component ratio is appropriately adjusted so that the viscosity is in the above-mentioned range. When the viscosity at room temperature is set to be high, even when a porous recording medium is used, penetration of the ink into the recording medium can be prevented, uncured monomer can be reduced, and the odor can be reduced. Furthermore, ink spreading when ink droplets have landed can be suppressed, and as a result there is the advantage that the image quality is improved. When the viscosity at room temperature is set to be low, since it is unnecessary to heat the ink when discharging or it is possible to set the heating temperature at a relatively low temperature, there are the advantages that the load on inkjet equipment becomes small and the choice of inkjet heads that can be used is widened.

The surface tension of the ink composition of the present invention is preferably 20 to 30 mN/m, and yet more preferably 23 to 28 mN/m. When recording is carried out on various types of recording medium such as polyolefin, PET, coated paper, and uncoated paper, from the viewpoint of spread and penetration, it is preferably at least 20 mN/m, and from the viewpoint of wettability it is preferably not more than 30 mN/m.

The ink composition of the present invention prepared in this way is suitably used as an inkjet recording ink. When it is used as an inkjet recording ink, recording is carried out by ejecting the ink composition onto a recording medium by means of an inkjet printer and then irradiating the ejected ink composition with radiation.

Since a printed material obtained using this ink has an image area cured by exposure to radiation such as ultraviolet rays and the strength of the image area is excellent, it can be used in various types of application other than formation of an image using the ink, such as, for example, formation of an ink receiving layer (image area) of a lithographic printing plate.

Inkjet Recording Method and Inkjet Recording Device

An inkjet recording method and an inkjet recording device that are desirably employed in the present invention are now explained.

The inkjet recording method of the present invention is an inkjet recording method comprising a step (a) of discharging an ink composition onto a recording medium, and a step (b) of irradiating the discharged ink composition with radiation so as to cure the ink composition, wherein the ink composition of the present invention is used.

Furthermore, the printed material of the present invention is a printed material recorded using the inkjet recording method.

In the inkjet recording method, it is preferable to heat the ink composition to 40° C. to 80° C. so as to reduce the viscosity of the ink composition to 5 to 10 mPa·s, and then carry out discharge; in accordance with the use of this method, a high discharge stability can be achieved. In general, since the radiation curing type ink composition has a higher viscosity than that of a water-based ink, variation in viscosity due to a change in temperature when printing is large. This viscosity variation of the ink composition directly has a large influence on the droplet size and droplet discharge speed, and since this causes a degradation in image quality, it is necessary to maintain the ink composition temperature at as uniform a level as possible when printing. The control range of the ink composition temperature is preferably set at ±5° C., more preferably ±2° C., and yet more preferably ±1° C.

The inkjet recording device is equipped with means for stabilizing the ink composition temperature, and a section that is to be maintained at a constant temperature includes an ink tank (a middle tank if there is a middle tank) and all pipes and members up to a nozzle discharge surface.

The method for controlling the temperature is not particularly restricted, and it is preferable to control heating according to the ink composition flow rate and the environmental temperature by providing, for example, a plurality of temperature sensors for each pipe section. Furthermore, a head heating unit is preferably thermally shielded or insulated so that the device main body is not influenced by the external temperature. In order to reduce the printer warm-up time required for heating, or in order to reduce the thermal energy loss, it is preferable for there to be thermal insulation from other sections and also for the heat capacity of the entire heating unit to be reduced.

Conditions for irradiation with radiation are now explained. A basic irradiation method is disclosed in JP-A-60-132767. Specifically, a light source is provided on either side of a head unit, and the head and the light sources are made to scan by a shuttle system. Irradiation is carried out after a certain time has elapsed from when the ink has landed. Curing is completed using another light source that is not driven. W099/54415 discloses, as an irradiation method, a method employing an optical fiber and a method in which a collimated light source is incident on a mirror surface provided on a head unit side face, and a recording part is irradiated with UV light. In the present invention, these irradiation methods may be used.

Examples of radiation that can be used here include α rays, γ rays, an electron beam, X rays, ultraviolet rays, visible light, and infrared light. Although it depends on the absorption characteristics of a sensitizing dye, it is desirable that the peak wavelength of the actinic radiation is for example 200 to 600 nm, preferably 300 to 450 nm, and more preferably 350 to 450 nm. In the present invention, the polymerization initiation system has sufficient sensitivity even for low output actinic radiation. Therefore, it is desirable that the output of the actinic radiation is, for example, 2,000 mJ/cm$^2$ or less, preferably 10 to 2,000 mJ/cm$^2$, more preferably 20 to 1,000 mJ/cm$^2$, and yet more preferably 50 to 800 mJ/cm$^2$ as an irradiation energy. Furthermore, it is desirable that the actinic radiation is applied with an exposure area illumination intensity of, for example, 10 to 2,000 mW/cm$^2$, and preferably 20 to 1,000 mW/cm$^2$.

Furthermore, in the present invention, it is preferable to heat the ink composition to a constant temperature and set the time from landing to irradiation at 0.01 to 0.5 sec., and preferably 0.01 to 0.3 sec., and it is yet more preferable to apply radiation after 0.01 to 0.15 sec. By controlling the time from landing to irradiation in this way so that it is very short, it becomes possible to prevent the landed ink from spreading before curing. Furthermore, since the ink composition can be irradiated before penetrating deep into a porous recording medium where a light source cannot reach, it is possible to suppress the amount of unreacted monomer remaining, and as a result the odor can be reduced. By using the above-mentioned inkjet recording method and the ink composition of the present invention, a large synergistic effect can be exhibited. In particular, by using an ink composition having an ink viscosity at 25° C. of 8 to 500 mP·s, a large effect can be obtained. By employing such a recording method, it is possible to maintain a uniform dot diameter for landed ink even for various types of recording media having different surface wettability, thereby improving the image quality. In order to obtain a color image, it is preferable to superimpose colors in order from those with a low lightness. If an ink having a low lightness is superimposed over another, it is difficult for radiation to reach the lower ink, the curing sensitivity is inhibited, the amount of residual monomer increases, the odor occurs, and the adhesion easily deteriorates. Furthermore, although it is possible to discharge all colors and then irradiate them at the same time, it is preferable to irradiate one color at a time from the viewpoint of promoting curing.

The inkjet recording device used in the present invention is not particularly restricted, and a commercial inkjet recording device may be used. That is, in the present invention, recording on a recording medium may be carried out using a commercial inkjet recording device.

The inkjet recording device that can be used in the present invention is equipped with, for example, an ink supply system, a temperature sensor, and an actinic radiation source.

The ink supply comprises, for example, a main tank containing the ink composition of the present invention, a supply pipe, an ink supply tank immediately before an inkjet head, a filter, and a piezo system inkjet head. The piezo system inkjet head may be driven so as to discharge a multisize dot of 1 to 100 pL, and preferably 8 to 30 pL, at a resolution of 320×320 to 4,000×4,000 dpi, preferably 400×400 to 1,600×1,600 dpi, and more preferably 720×720 dpi. Here, dpi referred to in the present invention means the number of dots per 2.54 cm.

As described above, since it is desirable for the radiation curing type ink to be discharged at a constant temperature, a section from the ink supply tank to the inkjet head is thermally insulated and heated. A method of controlling temperature is not particularly limited, but it is preferable to provide, for example, temperature sensors at a plurality of pipe section positions, and control heating according to the ink flow rate and the temperature of the surroundings. The temperature sensors may be provided on the ink supply tank and in the vicinity of the inkjet head nozzle. Furthermore, the head unit that is to be heated is preferably thermally shielded or insulated so that the device main body is not influenced by the temperature of the outside air. In order to reduce the printer start-up time required for heating, or in order to reduce the thermal energy loss, it is preferable to thermally insulate the head unit from other sections and also to reduce the heat capacity of the entire heated unit.

As an actinic radiation source, a mercury lamp, a gas/solid laser, etc. are mainly used, and for UV photocuring inkjet a mercury lamp and a metal halide lamp are widely known. However, from the viewpoint of protection of the environment, there has recently been a strong desire for mercury not to be used, and replacement by a GaN semiconductor UV light emitting device is very useful from industrial and environmental viewpoints. Furthermore, LEDs (UV-LED) and LDs (UV-LD) have small dimensions, long life, high efficiency, and low cost, and their use as a photocuring inkjet light source can be expected.

Furthermore, light-emitting diodes (LED) and laser diodes (LD) may be used as the source of actinic radiation. In particular, when a UV ray source is needed, a UV-LED or a UV-LD may be used. For example, Nichia Corporation has marketed a violet LED having a wavelength of the main emission spectrum of between 365 nm and 420 nm. Furthermore, when a shorter wavelength is needed, U.S. Pat. No. 6,084,250 discloses an LED that can emit actinic radiation whose wavelength is centered between 300 nm and 370 nm. Furthermore, another violet LED is available, and irradiation can be carried out with radiation of a different UV bandwidth. The actinic radiation source particularly preferable in the present invention is a UV-LED, and a UV-LED having a peak wavelength at 350 to 420 nm is particularly preferable.

The maximum illumination intensity of the LED on a recording medium is preferably 10 to 2,000 mW/cm$^2$, more preferably 20 to 1,000 mW/cm$^2$, and particularly preferably 50 to 800 mJ/cm$^2$.

Recording Medium

The recording medium to which the ink composition of the present invention can be applied is not particularly limited, and papers such as ordinary uncoated paper and coated paper, various types of non-absorbent resin material used as so-called flexible packaging, and resin films formed by molding the material into a film may be used, and examples of various types of plastic films include PET film, OPS film, OPP film, ONy film, PVC film, PE film, and TAC film. Other examples of plastic that can be used as a recording medium material include polycarbonate, acrylic resin, ABS, polyacetal, PVA, and rubber. Furthermore, metal and glass may be used as a recording medium.

Since the ink composition of the present invention has little thermal shrinkage during curing and has excellent adhesion to a substrate (recording medium), even for a film for which curling and deformation of the film easily occur due to ink curing shrinkage or heat generation during a curing reaction such as, for example, PET film, OPS film, OPP film, ONy film, or PVC film, which are thermally shrinkable, a high precision image can be formed advantageously.

Lithographic Printing Plate

Suitable examples of applications of the ink composition of the present invention include application to a lithographic printing plate.

A process for producing a lithographic printing plate of the present invention comprises a step (a) of discharging the ink composition of the present invention onto a hydrophilic support, and a step (b) of irradiating the discharged ink composition with radiation so as to cure the ink composition, thus forming a hydrophobic image on the hydrophilic support by curing the ink composition.

Furthermore, the lithographic printing plate of the present invention is a lithographic printing plate produced by the above-mentioned process for producing a lithographic printing plate.

By discharging the ink composition of the present invention onto a hydrophilic support using an inkjet recording device, etc. and then irradiating the ink with radiation so as to cure it to form a hydrophobic image, a hydrophobic ink-receiving region is formed imagewise on the surface of the hydrophilic support. By supplying an ink and a water-based component, the water-based component is retained by a region exposed on the hydrophilic support, the ink is retained on the hydrophobic image, and a printing step can be carried out in this state.

Since the ink composition of the present invention exhibits excellent curing properties on exposure to radiation, the lithographic printing plate of the present invention employing the above has an image area having excellent plate life. Furthermore, by using an inkjet recording device for forming an image area, a high precision lithographic printing plate image area can be formed directly according to digital data.

The ink composition used in production of a lithographic printing plate may employ the above-mentioned ink composition of the present invention as it is.

Support

A support that is preferably used when preparing a lithographic printing plate of the present invention is now explained.

The support used in the lithographic printing plate of the present invention is not particularly limited, and a dimensionally stable sheet-form support may be used. When a material forming the support has a hydrophilic surface, it may be used as it is, or the surface of the sheet-form material forming the support may be subjected to a hydrophilization treatment.

Examples of materials forming the support include paper, paper laminated with a plastic (e.g. polyethylene, polypropylene, polystyrene, etc.), a metal sheet (e.g. aluminum, zinc, copper, etc.), a plastic film (e.g. cellulose diacetate, cellulose triacetate, cellulose propionate, cellulose butyrate, cellulose acetate butyrate, cellulose nitrate, polyethylene terephthalate, polyethylene, polystyrene, polypropylene, polycarbonate, polyvinyl acetal, etc.), and paper or plastic film on which the above-mentioned metal is laminated or vapor-deposited. Preferred examples of the support include a polyester film and aluminum sheet. Among these, aluminum sheet is particularly preferable since the dimensional stability is good and it is relatively inexpensive.

The aluminum sheet is a pure aluminum sheet, an alloy sheet containing aluminum as a main component and a small amount of a different element, or a thin film of aluminum or an aluminum alloy laminated with a plastic. Examples of the different element contained in the aluminum alloy include silicon, iron, manganese, copper, magnesium, chromium, zinc, bismuth, nickel, and titanium. The content of the different element in the alloy is preferably equal to or less than 10 wt %. In the present invention, a pure aluminum sheet is preferable, but since it is difficult to produce completely pure aluminum because of the refining technique, a trace amount of a different element may be contained. The composition of the aluminum sheet is not specified, and a known generally used material may be utilized as appropriate.

The support preferably has a thickness of 0.1 to 0.6 mm, and more preferably 0.15 to 0.4 mm.

Prior to the aluminum sheet being used, it is preferably subjected to a surface treatment such as a surface roughening treatment or an anodizing treatment. Surface treatment makes it easy to improve the hydrophilicity and ensure that there is good adhesion between an image recording layer and the support. Prior to the aluminum sheet being subjected to the surface roughening treatment, it may be subjected as desired to a degreasing treatment using a surfactant, an organic solvent, an aqueous alkaline solution, etc. in order to remove rolling oil on the surface.

The surface roughening treatment for the aluminum sheet surface may be carried out by various types of methods, and examples thereof include a mechanical surface roughening treatment, an electrochemical surface roughening treatment (a surface roughening treatment involving dissolving the surface electrochemically), and a chemical surface roughening treatment (a surface roughening treatment involving selectively dissolving the surface chemically).

As a method for the mechanical surface roughening treatment, a known method such as a ball grinding method, a brush grinding method, a blast grinding method, or a buff grinding method may be used. It is also possible to use a transfer method in which an irregular shape is transferred using a roller provided with irregularities in an aluminum rolling stage.

As a method for the electrochemical surface roughening treatment, for example, a method in which alternating current or direct current is applied in an electrolyte solution containing an acid such as hydrochloric acid or nitric acid can be cited. It is also possible to employ a method as described in JP-A-54-63902 in which a mixed acid is used.

The aluminum sheet subjected to a surface roughening treatment is subjected as necessary to an alkali etching treatment using an aqueous solution of potassium hydroxide, sodium hydroxide, etc.; furthermore, after neutralization, it may be subjected to an anodizing treatment as desired in order to improve the abrasion resistance.

As an electrolyte that may be used for the anodizing treatment of the aluminum sheet, various types of electrolytes that form a porous oxide film may be used. In general, sulfuric acid, hydrochloric acid, oxalic acid, chromic acid, or a mixed acid thereof may be used. The concentration of the electrolyte may be determined as appropriate according to the type of electrolyte.

Conditions for the anodizing treatment depend on the type of electrolyte used and cannot be specified, but in general the electrolyte solution concentration is 1 to 80 wt%, the solution temperature is 5° C. to 70° C., the current density is 5 to 60 A/dm$^2$, the voltage is 1 to 100V, and the electrolysis time is 10 sec. to 5 min. The amount of anodized film formed is preferably 1.0 to 5.0 g/m$^2$, and more preferably 1.5 to 4.0 g/m$^2$. It is preferable for it to be in this range since good plate life and good scratch resistance of a non-image area of a lithographic printing plate can be obtained.

As the support that can be used in the present invention, a substrate that has been subjected to the above-mentioned surface treatment and has an anodized film may be used as it is, but in order to further improve the adhesion to an upper layer, and the hydrophilicity, the contamination resistance, the thermal insulation, etc., the substrate may appropriately be subjected as necessary to a treatment for enlarging micropores of the anodized film, a sealing treatment, or a surface hydrophilization treatment involving immersion in an aqueous solution containing a hydrophilic compound, which are described in JP-A-2001-253181 or JP-A-2001-322365. These enlarging and sealing treatments are not limited to those described therein, and any conventionally known methods may be employed.

Sealing Treatment

The sealing treatment may be vapor sealing, a treatment with an aqueous solution containing an inorganic fluorine compound such as a single treatment with fluorozirconic acid or a treatment with sodium fluoride, vapor sealing with added lithium chloride, or a sealing treatment with hot water.

Among these, the sealing treatment with an aqueous solution containing an inorganic fluorine compound, the sealing treatment with vapor, and the sealing treatment with hot water are preferable.

Hydrophilization Treatment

A hydrophilization treatment used in the present invention is an alkali metal silicate method as described in U.S. Pat. Nos. 2,714,066, 3,181,461, 3,280,734, and 3,902,734. In this method, a support is immersed in an aqueous solution of sodium silicate, etc. or subjected to electrolysis. Other than the above, there are a method described in JP-B-36-22063 in which the support is treated with potassium fluorozirconate, and a method as described in U.S. Pat. Nos. 3,276,868, 4,153,461, and 4,689,272 in which the support is treated with polyvinyl phosphonate.

The support of the present invention preferably has a center line average roughness of 0.10 to 1.2 μm. In this range, good adhesion to an image recording layer, good plate life, and good contamination resistance can be obtained.

In accordance with the present invention, it is possible to provide an ink composition that cures with high sensitivity when exposed to radiation, can form a high quality image, has excellent adhesion to a recording medium, and has good storage stability, and an inkjet recording method employing the ink composition.

Furthermore, a printed material obtained using the ink composition having excellent storage stability and capable of curing with high sensitivity when exposed to ultraviolet rays has high image quality, excellent strength for an image area. Similarly, in accordance with use of the ink composition of the present invention, there is exhibited the effect that a lithographic printing plate having high plate life and high image quality can be produced based on digital data.

EXAMPLES

The present invention is explained more specifically below by reference to Examples, but the present invention should not be construed as being limited to the modes of these Examples.

Example 1

Prepraration of Pigment Dispersion

Pigment dispersions 1 of each of yellow, magenta, cyan, and black were prepared according to the method below. Dispersion conditions were appropriately adjusted so that the average particle size of the pigment particles in each case was in the range of 0.2 to 0.3 μm using a known dispersing device, and subsequently they were filtered using a filter while heating.

Yellow Pigment Dispersion 1

| | |
|---|---|
| Cl Pigment Yellow 13 | 20 parts by weight |
| Polymeric dispersant (Solsperse series, manufactured by Zeneca) | 20 parts by weight |
| Diethylene glycol divinyl ether (manufactured by BASF) | 40 parts by weight |
| Bis(3-ethyl-3-oxetanylmethyl)ether (OXT-221, manufactured by Toagosei) | 20 parts by weight |

Magenta Pigment Dispersion 1

| | |
|---|---|
| Cl Pigment Red 57:1 | 20 parts by weight |
| Polymeric dispersant (Solsperse series, manufactured by Zeneca) | 20 parts by weight |
| Diethylene glycol divinyl ether (manufactured by BASF) | 40 parts by weight |
| Bis(3-ethyl-3-oxetanylmethyl)ether (OXT-221, manufactured by Toagosei) | 20 parts by weight |

Cyan Pigment Dispersion 1

| | |
|---|---|
| Cl Pigment Blue 15:3 | 20 parts by weight |
| Polymeric dispersant (Solsperse series, manufactured by Zeneca) | 20 parts by weight |
| Diethylene glycol divinyl ether (manufactured by BASF) | 40 parts by weight |
| Bis(3-ethyl-3-oxetanylmethyl)ether (OXT-221, manufactured by Toagosei) | 20 parts by weight |

Black Pigment Dispersion 1

| | |
|---|---|
| Cl Pigment Black 7 | 20 parts by weight |
| Polymeric dispersant (Solsperse series, manufactured by Zeneca) | 20 parts by weight |
| Diethylene glycol divinyl ether (manufactured by BASF) | 40 parts by weight |
| Bis(3-ethyl-3-oxetanylmethyl)ether (OXT-221, manufactured by Toagosei) | 20 parts by weight |

Preparation of Ink

The components below were mixed and filtered using a filter to give an ink 1 of each color.

Yellow Ink 1

| | |
|---|---|
| (a) Cationically polymerizable compounds | |
| Celloxide 2021A (epoxy compound: manufactured by Daicel-UCB Co., Ltd.) | 35 parts by weight |
| OXT-221 (oxetane compound: manufactured by Toagosei Co., Ltd.) | 55 parts by weight |
| (b) Photo-acid generator | |
| Compound example (b-27)/(b-32) = 1/2 | 5 parts by weight |
| (c) Colorant (the above pigment dispersion) | |
| Yellow pigment dispersion 1 | 5 parts by weight |
| (d) Salt of weak acid having pKa of 4 to 8 | |
| Trimethylbenzylammonium salt of specific example (4) (pKa 4.9) | 0.5 parts by weight |

Magenta Ink 1

| | |
|---|---|
| (a) Cationically polymerizable compounds | |
| Celloxide 2021 (epoxy compound: manufactured by Daicel-UCB Co., Ltd.) | 35 parts by weight |
| OXT-221 (oxetane compound: manufactured by Toagosei Co., Ltd.) | 55 parts by weight |
| (b) Photo-acid generator | |
| Compound example (b-3) | 5 parts by weight |
| (c) Colorant (the above pigment dispersion) | |
| Magenta pigment dispersion 1 | 5 parts by weight |
| (d) Salt of weak acid having pKa of 4 to 8 | |
| Tetramethylammonium salt of specific example (18) (pKa 4.2) | 0.5 parts by weight |

Cyan Ink 1

| | |
|---|---|
| (a) Cationically polymerizable compounds | |
| Celloxide 2021 (epoxy compound: manufactured by Daicel-UCB Co., Ltd.) | 35 parts by weight |
| OXT-221 (oxetane compound: manufactured by Toagosei Co., Ltd.) | 55 parts by weight |
| (b) Photo-acid generator | |
| Compound example (b-75) | 5 parts by weight |
| (c) Colorant (the above pigment dispersion) | |
| Cyan pigment dispersion 1 | 5 parts by weight |
| (d) Salt of weak acid having pKa of 4 to 8 | |
| Tetramethylammonium salt of specific example (18) (pKa 4.2) | 0.5 parts by weight |

Black Ink 1

| | |
|---|---|
| (a) Cationically polymerizable compounds | |
| Celloxide 2021 (epoxy compound: manufactured by Daicel-UCB Co., Ltd.) | 35 parts by weight |
| OXT-221 (oxetane compound: manufactured by Toagosei Co., Ltd.) | 55 parts by weight |
| (b) Photo-acid generator | |
| Compound example (b-10) | 5 parts by weight |
| (c) Colorant (the above pigment dispersion) | |
| Black pigment dispersion 1 | 5 parts by weight |
| (d) Salt of weak acid having pKa of 4 to 8 | |
| Trimethylbenzylammonium salt of specific example (4) (pKa 4.9) | 0.5 parts by weight |
| Sensitizer | |
| 9,10-Dimethoxyanthracene | 0.5 parts by weight |

Inkjet Image Recording (Evaluation of Multicolor Image)

Subsequently, recording was carried out on a recording medium using a commercial inkjet recording device having a piezo system inkjet nozzle. The ink supply system comprised a main tank, a supply pipe, an ink supply tank immediately before an inkjet head, a filter, and a piezo system inkjet head, and a section from the ink supply tank to the inkjet head was thermally insulated and heated. Temperature sensors were provided on the ink supply tank and in the vicinity of the nozzle of the inkjet head, and the temperature was controlled so that the nozzle section was always at 40° C.±2° C. The piezo system inkjet head was driven so as to discharge a multisize dot of 8 to 30 pL at a resolution of 720×720 dpi. The exposure system, the main scanning speed, and the discharge frequency were adjusted so that, after landing, UV-A light was focused to give an exposure area illumination intensity of 100 mW/cm$^2$, and irradiation started 0.1 sec. after the ink landed on the recording medium. Furthermore, the exposure time was made variable, and exposure energy was applied. Here, dpi referred to in the present invention denotes the number of dots per 2.54 cm.

The inks of each color prepared above were discharged at an environmental temperature of 25° C. in the order black □ cyan □ magenta □ yellow, and irradiation with ultraviolet rays was carried out after each color was discharged. As an energy level that could completely cure the inks so that tackiness disappeared when touched by hand, the total exposure energy per color was 300 mJ/cm² for all the colors. As recording media, a grained aluminum support, a transparent biaxially stretched polypropylene film whose surface had been treated so as to impart printability, a soft vinyl chloride sheet, a cast coat paper, and a commercial recycled paper were used, each color image was recorded, and an image having high resolution without dot spreading was obtained in all cases. Furthermore, for high quality paper, the ink did not penetrate to the reverse side, the ink was sufficiently cured, and there was hardly any odor due to unreacted monomer. Moreover, the ink recorded on the film had sufficient flexibility, the ink did not crack when bent, and there was no problem in an adhesion test involving peeling with cellophane tape.

Examples 2 to 8, Comparative Examples 1

Preparation of Ink

Magenta Inks 2 to 9

| | |
|---|---|
| Cationically polymerizable compound (a) | 90 parts by weight |
| Photo-acid generator (b) | 5 parts by weight |
| Colorant (c) (the magenta pigment dispersion 1 above) | 5 parts by weight |
| (d) Salt of weak acid having pKa of 4 to 8 | 0.5 parts by weight |
| Sensitizer as necessary | 0.5 parts by weight |

Compounds of each of the components used in Examples 2 to 8 (magenta inks 2 to 8) and Comparative Example 1 (magenta ink 9) are shown in Table 2 below. The salts of weak acids used were all tetramethylammonium salts. The pKa values of the weak acids are also given in Table 2 below.

Details of the cationically polymerizable compound, organic acidic component, and sensitizer described in Table 2 are as follows.

Cationically polymerizable compound (1): Celloxide 2021 (epoxy, manufactured by Daicel-UCB Co., Ltd.)/OXT-221 (oxetane, manufactured by Toagosei Co., Ltd.)=35/55 mixture Cationically polymerizable compound (2): Celloxide 3000 (epoxy, manufactured by Daicel-UCB Co., Ltd.)/OXT-211 (oxetane, manufactured by Toagosei Co., Ltd.)=50/40 mixture Cationically polymerizable compound (3): bisphenol A-diglycidyl ether/OXT-221 (oxetane, manufactured by Toagosei Co.; Ltd.)=40/50 mixture Cationically polymerizable compound (4): Celloxide 2021 (epoxy, manufactured by Daicel-UCB Co., Ltd.)/OXT-101 (oxetane, manufactured by Toagosei Co., Ltd.)=55/35 mixture Sensitizer (5): 9,10-dimethoxyanthracene Sensitizer (6): pyrene In Comparative Example 1, 0.03 parts by weight of octylamine (II) was added.

Examples 9

Magenta ink 10 was prepared in the same manner as for Magenta ink 1 except that Compound M-1 below (oxidation potential +1.40V) was used as an oil-soluble dye instead of CI Pigment Red 57:1.

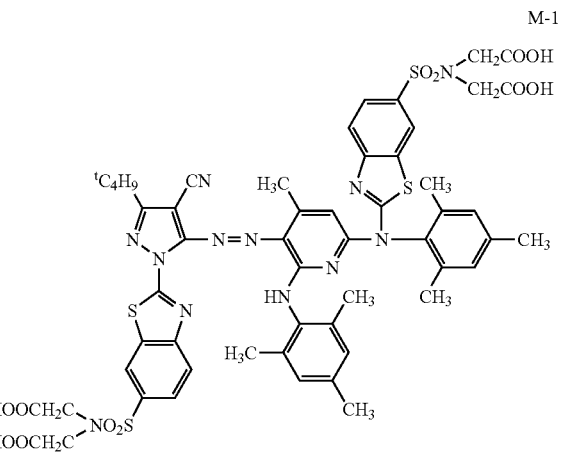

M-1

Examples 10

Magenta ink 11 was prepared in the same manner as for Magenta ink 1 except that Compound M-2 below (oxidation potential +0.70V) was used as an oil-soluble dye instead of CI Pigment Red 57:1.

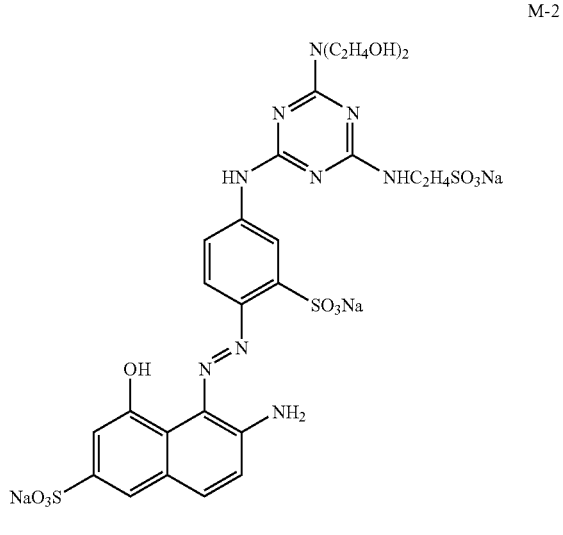

M-2

Inkjet Image Recording (Single Color Image Evaluation)

A magenta image was printed by the same method as described in Example 1 using the magenta inks 2 to 11 prepared above.

1. Inkjet Image Evaluation

Subsequently, with regard to each of images thus formed, the sensitivity required for curing, penetration into commercial recycled paper, ink spread on a grained aluminum support, adhesion, plate life, and storage stability were evaluated in accordance with the methods described below.

2. Curing Sensitivity Measurement

The exposure energy intensity (mJ/cm²) when a feeling of tackiness disappeared on the image surface after irradiation with ultraviolet rays was defined as the curing sensitivity. The smaller the value, the higher the sensitivity.

3. Storage Stability Evaluation

After storing the prepared ink at 75% RH and 60° C. for 3 days, the ink viscosity at the discharge temperature was measured, and an increase in the ink viscosity was expressed as a viscosity ratio (after storage/before storage). When the viscosity was unchanged and the ratio was close to 1.0, the storage stability was good, and if the ratio exceeded 1.5, clogging might undesirably be caused during discharge.

4. Evaluation of Penetration into Commercial Recycled Paper

Penetration was evaluated in accordance with the criteria below with respect to an image printed on commercial recycled paper.

Good: little penetration, no odor due to residual monomer.

Fair: slight penetration, slight odor due to residual monomer.

Poor: ink obviously penetrated to the reverse side, strong odor due to residual monomer.

5. Evaluation of Ink Spread on Grained Aluminum Support

With respect to an image printed on a grained aluminum support, ink spread was evaluated in accordance with the criteria below.

Good: no spread between adjacent dots.

Fair: dots slightly spread.

Poor: dots spread and image was obviously blurred.

6. Evaluation of Adhesion to Grained Aluminum Support

With regard to the printed images formed above, a completely undamaged sample and a sample whose printed surface was crosshatched with 11 cuts in both lengthwise and widthwise directions at intervals of 1 mm in accordance with JIS K 5400 to give 100 1 mm squares were prepared, cellophane tape was affixed to the surface of each sample and peeled off quickly at an angle of 90 degrees, and the condition of the remaining printed image that had not been peeled off was evaluated in accordance with the criteria below.

Good: printed image was not peeled off at all in the crosshatch test.

Fair: the ink was slightly peeled off in the crosshatch test, but unless the ink surface was damaged little was peeled off.

Poor: easily peeled off by cellophane tape under both conditions.

Evaluation as Lithographic Printing Plate

An image was formed on the grained aluminum support prepared above by printing using the ink composition of the present invention. This was evaluated as a lithographic printing plate.

a. Evaluation of Image

The lithographic printing plate prepared using the ink composition of the present invention was mounted on a Heidel KOR-D machine and printing was carried out by supplying an ink (sheet-feed VALUES-G magenta (manufactured by Dainippon Ink and Chemicals, Inc.) and dampening solution (Ecolity 2 (manufactured by Fuji Photo Film Co., Ltd.). After printing 100 sheets, the printed material was visually evaluated in accordance with the criteria below.

Good: image obtained had no white spots in the image area, and no contamination on the non-image area.

Fair: a few white spots were observed in the image area and/or slight contamination was observed in the non-image area.

Poor: white spots in the image area and/or contamination in the non-image area were observed at a level that caused problems in actual use.

b. Evaluation of Plate Life

Printing was continued, and the number of prints completed was compared as an index for the plate life (the number obtained for Comparative Example 1 was defined as 100). The larger the number, the longer the plate life, which is preferable.

These evaluation results are given in Table 2.

TABLE 2

| | Example | | | | | | | | | |
|---|---|---|---|---|---|---|---|---|---|---|
| | Example 2 | Example 3 | Example 4 | Example 5 | Example 6 | Example 7 | Example 8 | Example 9 | Example 10 | Comp. Ex. 1 |
| Magenta ink | 2 | 3 | 4 | 5 | 6 | 7 | 8 | 10 | 11 | 9 |
| (a) Cationically polymerizable compound | (1) | (1) | (2) | (3) | (3) | (4) | (4) | (1) | (1) | (4) |
| (b) Photo-acid generator | b-10 | b-78 | b-18 | b-40 | b-24/b-29 (1/1) | b-59 | b-3 | b-75 | b-75 | b-3 |
| (c) Salt of weak acid (pKa value) | Specific example (5) (4.9) | Specific example (8) (4.3) | Specific example (18) (4.2) | Specific example (29) (4.2) | Specific example (19) (4.4) | Specific example (33) (5.7) | Specific example (41) (4.8) | Specific example (15) (4.4) | Specific example (34) (4.2) | Octylamine |
| Sensitizer | None | (5) | None | (6) | None | (6) | None | (5) | (5) | None |
| Penetration into recycled paper | Good | Good | Good | Good | Good | Good | Good | Good | Good | Fair |
| Spreading on aluminum support | Good | Good | Good | Good | Good | Good | Good | Good | Good | Fair |
| Adhesion to aluminum support | Good | Good | Good | Good | Good | Good | Good | Good | Good | Good |
| Curing sensitivity (mJ/cm$^2$) | 350 | 300 | 340 | 310 | 330 | 310 | 340 | 240 | 280 | 550 |
| Ink storage stability | 1.1 | 1.2 | 1.1 | 1.1 | 1.1 | 1.1 | 1.1 | 1.1 | 1.1 | 1.6 |

TABLE 2-continued

| | Example | | | | | | | | | |
|---|---|---|---|---|---|---|---|---|---|---|
| | Example 2 | Example 3 | Example 4 | Example 5 | Example 6 | Example 7 | Example 8 | Example 9 | Example 10 | Comp. Ex. 1 |
| Evaluation of image on lithographic printing plate | Good | Good | Good | Good | Good | Good | Good | Good | Good | Good |
| Plate life | 145 | 145 | 135 | 145 | 145 | 155 | 145 | 145 | 155 | 100 |

Example 11

A magenta image was formed using Magenta ink 1 by the same method as in Example 1 except that a UV light-emitting diode (UV-LED) was used instead of the VZero 085 metal halide lamp manufactured by Integration Technology.

In this embodiment, an NCCU033 manufactured by Nichia Corporation was used as the UV-LED. The LED emits UV light at a wavelength of 365 nm from 1 chip, and by applying a current of about 500 mA, light of about 100 mW is emitted from the chip. A plurality thereof were aligned at intervals of 7 mm to give a power of 0.3 W/cm$^2$ on the surface of a recording medium (hereinafter, also called a medium). The time from landing to irradiation and the exposure time can be varied by the transport speed of the medium and the distance between a head and the LED in the transport direction. In this embodiment, irradiation was carried out about 0.5 sec. after landing.

The exposure energy on the medium was adjustable in the range of 0.01 to 15 J/cm$^2$ by setting the distance from the medium and the transport speed.

It was found that the energy level that could completely cure the ink so that tackiness disappeared when touched by hand was 250 mJ/cm$^2$. As recording media, a grained aluminum support, a transparent biaxially stretched polypropylene film whose surface had been treated so as to impart printability, a soft vinyl chloride sheet, a cast coat paper, and a commercial recycled paper were used, color images were recorded, and an image having high resolution without dot spreading was obtained in all cases. Furthermore, for high quality paper, the ink did not penetrate to the reverse side, the ink was sufficiently cured, and there was hardly any odor due to unreacted monomer. Moreover, the ink recorded on the film had sufficient flexibility, the ink did not crack when bent, and there was no problem in an adhesion test involving peeling with Sellotape (registered trademark).

After the ink was discharged continuously for 30 minutes using a CA3 piezo inkjet head (manufactured by Toshiba Tec Corporation), when the nozzles were examined, there were no nozzles in which clogging had occurred, and there were no problems. Furthermore, after a CA3 piezo inkjet head (manufactured by Toshiba Tec Corporation) was partially immersed in the prepared ink at 50° C. for 1 week, when corrosion (discoloration) of the immersed metal part was examined, there was no discoloration, and there were no problems.

From the above results, the ink composition of each example cured with high sensitivity toward radiation, could form a high quality image on paper in terms of image forming properties, and exhibited good storage stability. In this way, in the present invention, curing sensitivity, suppression of spreading on a non-permeable support, and storage stability of the ink are accomplished at the same time.

On the other hand, the ink composition of Comparative Example 1, which does not contain (d) the salt of the weak acid having a pKa of 4 to 8, had a problem with storage stability, and was rather poor in terms of penetration into recycled paper, spreading on an aluminum support, and curing sensitivity.

Furthermore, it has been found that a lithographic printing plate with an image formed by the ink composition of the present invention can form high quality images and has a good plate life.

What is claimed is:

1. An ink composition comprising:
   (a) a cationically polymerizable compound;
   (b) a compound that generates an acid when exposed to radiation;
   (c) a colorant; and
   (d) a salt of a weak acid having a pKa of 4 to 8.

2. The ink composition according to claim 1, wherein the salt of the weak acid having a pKa of 4 to 8 is an ammonium salt.

3. The ink composition according to claim 1, wherein the colorant is a pigment or an oil-soluble dye.

4. The ink composition according to claim 3, wherein the oil-soluble dye has an oxidation potential of 1.0 V (vs SCE) or greater.

5. The ink composition according to claim 1, wherein it is for inkjet recording.

6. The ink composition according to claim 1, wherein the salt of the weak acid having a pKa of 4 to 8 is a salt of an aromatic carboxylic acid.

7. The ink composition according to claim 1, wherein it is for inkjet recording.

8. An inkjet recording method comprising:
   a step (a) of discharging an ink composition onto a recording medium; and
   a step (b) of irradiating the discharged ink composition with actinic radiation so as to cure the ink composition, the ink composition being the ink composition according to claim 1.

9. The inkjet recording method according to claim 8, wherein the actinic radiation is ultraviolet radiation emitted by a light emitting diode that has a light emission peak wavelength in the range of 350 to 420 nm and generates ultraviolet radiation whose maximum illumination intensity on the surface of a recording medium is 10 to 2,000 mW/cm$^2$.

10. A printed material recorded by the inkjet recording method according to claim 9.

11. A process for producing a lithographic printing plate, the process comprising:
   a step (a) of discharging the ink composition according to claim 1 onto a hydrophilic support; and
   a step (b) of irradiating the discharged ink composition with actinic radiation so as to cure the ink composition, thus forming a hydrophobic image on the hydrophilic support by curing the ink composition.

12. A lithographic printing plate produced by the lithographic printing plate production process according to claim 11.

* * * * *